United States Patent
Villafranca et al.

(10) Patent No.: US 12,496,281 B2
(45) Date of Patent: Dec. 16, 2025

(54) COMPOUNDS FOR PREVENTION AND TREATMENT OF HEMORRHAGE AND VASCULATURE INSTABILITY

(71) Applicants: Abrexa Pharmaceuticals, Inc., San Diego, CA (US); The Penn State Research Foundation, University Park, PA (US)

(72) Inventors: Jesus E. Villafranca, San Diego, CA (US); Charles Richard Kissinger, San Diego, CA (US); Guohong Li, Hummelstown, PA (US)

(73) Assignee: ABREXA PHARMACEUTICALS, INC., San Diego, CA (US)

( * ) Notice: Subject to any disclaimer, the term of this patent is extended or adjusted under 35 U.S.C. 154(b) by 468 days.

(21) Appl. No.: 18/173,743

(22) PCT Filed: Aug. 23, 2021

(86) PCT No.: PCT/US2021/047221
§ 371 (c)(1),
(2) Date: Feb. 23, 2023

(87) PCT Pub. No.: WO2022/046676
PCT Pub. Date: Mar. 3, 2022

(65) Prior Publication Data
US 2024/0307331 A1 Sep. 19, 2024

Related U.S. Application Data

(60) Provisional application No. 63/121,192, filed on Dec. 3, 2020, provisional application No. 63/069,646, filed on Aug. 24, 2020.

(51) Int. Cl.
*A61K 31/167* (2006.01)
*A61K 38/48* (2006.01)
*A61P 7/04* (2006.01)
*A61P 9/10* (2006.01)

(52) U.S. Cl.
CPC .......... *A61K 31/167* (2013.01); *A61K 38/482* (2013.01); *A61P 7/04* (2018.01); *A61P 9/10* (2018.01); *C12Y 304/21068* (2013.01)

(58) Field of Classification Search
CPC .................................................. A61K 31/167
See application file for complete search history.

(56) References Cited

U.S. PATENT DOCUMENTS

2010/0305181 A1  12/2010  Schubert
2014/0227350 A1   8/2014  Wang et al.

FOREIGN PATENT DOCUMENTS

WO    2016/122288 A2   8/2016
WO    2017/015660 A1   1/2017

OTHER PUBLICATIONS

China National Intellectual Property Administration, Search Report issued in CN Patent Application No. 2021800714368, May 30, 2024, pp. 1-2.
European Patent Office, Extended European Search Report issued in EP Patent Application No. 21862509.3, Aug. 7, 2024, pp. 1-12.
Bai et al., "Revisiting cerebral postischemic reperfusion injury: new insights in understanding reperfusion failure, hemorrhage, and edema", World Stroke Organization, Feb. 2015, pp. 143-152, vol. 10.
Currais et al., "A comprehensive multiomics approach toward understanding the relationship between aging and dementia", Aging, Nov. 11, 2015, pp. 937-955, vol. 7 (11).
Kanazawa et al., "Therapeutic Strategies to Attenuate Hemorrhagic Transformation After Tissue Plasminogen Activator Treatment for Acute Ischemic Stroke", Journal of Atherosclerosis and Thrombosis, Dec. 13, 2016, pp. 240-253, vol. 24(3).
Lin et al., "Ischemia-reperfusion Injury in the Brain: Mechanisms and Potential Therapeutic Strategies", Biochemistry & Pharmacology: Open Access, Jan. 1, 2016, pp. 1-16, vol. 5(4).
Yang et al., "Neuroinflammatory mechanisms of blood-brain barrier damage in ischemic stroke", American Journal of Physiology Cell Physiology, Feb. 1, 2019, pp. C135-C153, vol. 316(2).
Patent Cooperation Treaty, International Search Report issued in PCT/US2021/047221, Feb. 1, 2022, pp. 1-6.
Saver et al., "Stent-Retriever Thrombectomy after Intravenous t-PA vs. t-PA Alone in Stroke", The New England Journal Of Medicine, Jun. 11, 2015, pp. 2285-2295, vol. 372(24).
Grammaticakis, "L'absorption dans l'ultraviolet moyen des N-acetylphenylhydrazones est sensiblement identique a celle des acetylhydrazones correspondantes", Comptes rendus hebdomadaires des seances de l'Academie des sciences, May 12, 1969, pp. 1-4, Serie C, Chemical Sciences, vol. 268. English machine translated.
Japanese Intellectual Property Office, Official Action Issued in JP Patent Application No. 2023-513132, Aug. 13, 2025, pp. 1-5, English Translation.
Lapchak et al., "Abstract TP260: A Novel Neurogenic-Stem Cell Stimulating Curcumin analog to Treat Acute Ischemic Stroke", Stroke, Jan. 22, 2018, pp. ATP260-ATP260, vol. 49(1), Abstract, URL https://www.ahajournals.org/doi/abs/10.1161/str.49.suppl_1.TP260.

*Primary Examiner* — Yong S. Chong
(74) *Attorney, Agent, or Firm* — Pillsbury Winthrop Shaw Pittman LLP

(57) ABSTRACT

Hemorrhage and vascular instability can be induced by thrombolytic and anti-coagulant therapies. Presented herein, in certain aspects, are methods for the treatment and/or prevention of hemorrhage and vascular instability that comprise administering a compound disclosed herein to a subject in need thereof.

15 Claims, 11 Drawing Sheets tPA treated: at 4h

Bederson Scale:  3

2

Bederson Scale:  3

4 tPA + J147: treated at 4h

J147-eMCAO dose-response:

Vehicle    1 mg/kg    10 mg/kg    30 mg/kg

J147

COMPOUNDS FOR PREVENTION AND TREATMENT OF HEMORRHAGE AND VASCULATURE INSTABILITY

FIELD OF THE INVENTION

Provided herein, in certain aspects, are methods for the treatment and/or prevention of hemorrhage and vascular instability that comprise administering a compound disclosed herein to a subject in need thereof.

BACKGROUND

Thrombolytic and anticoagulant therapies are often administered to prevent blood clot formation and/or to dissolve or break up blood clots. However such agents often have an adverse effect of inducing hemorrhage and/or vascular instability such as localized edema, loss of vascular tone and disruption of blood brain barrier function. Compounds disclosed herein can be used to prevent and/or treat hemorrhage and vascular instability induced by thrombolytic and anti-coagulant therapies.

SUMMARY

In certain aspects, provided herein are methods of preventing, reducing a risk of, inhibiting, reducing, mitigating and/or treating hemorrhage and/or vascular instability in a subject, wherein the hemorrhage or vascular instability is induced by a thrombolytic therapy, an anticoagulant therapy, and/or an endovascular intervention therapy, where the methods comprise administering a therapeutically effective amount of a compound disclosed herein to the subject.

In certain aspects, provided herein are methods of protecting and/or stabilizing vascular endothelium in a subject, where the methods comprise administering a therapeutically effective amount of a compound disclosed herein to the subject.

In certain aspects, provided herein are methods of preventing and/or treating disruption of the blood brain barrier in a subject where the methods comprise administering a therapeutically effective amount of a compound disclosed herein to the subject.

In some embodiments, the compound disclosed herein for use in any of the disclosed methods is a compound of Formula I, II, III or IV. In some embodiments, such a compound comprises the structure of Formula IV. In some embodiments, such a compound comprises the structure of Formula IV;

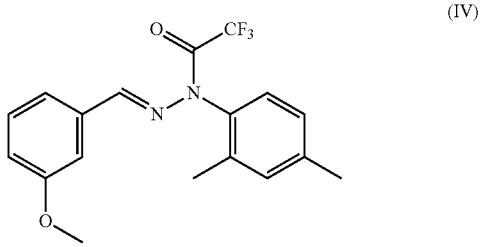 [SMILES: COc1cccc(/C=N/N(C(=O)C(F)(F)F)c2ccc(C)cc2C)c1]

(IV)

or a pharmaceutically acceptable salt, stereoisomer or tautomer thereof.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIG. 1A & FIG. 1B are control animals treated with placebo and showing Bederson Scores 3 and 5, and significant infarct volume (white). FIGS. 1C & 1D are animals treated with 1 mg/kg J147 administered intravascularly (iv), showing better Bederson Scores of 3 and 3, and insignificant reduction in infarct volume relative to placebo. FIGS. 1E & 1F are animals treated with 10 mg/kg iv J147, showing much improved Bederson scores of 1 and 2, and a large reduction of infarct volume. FIG. 1G & 1H are animals treated with J147 administered intraperitoneally, showing Bederson scores of 2 and 3, and modest reduction of infarct volume.

DETAILED DESCRIPTION

Figure 1:
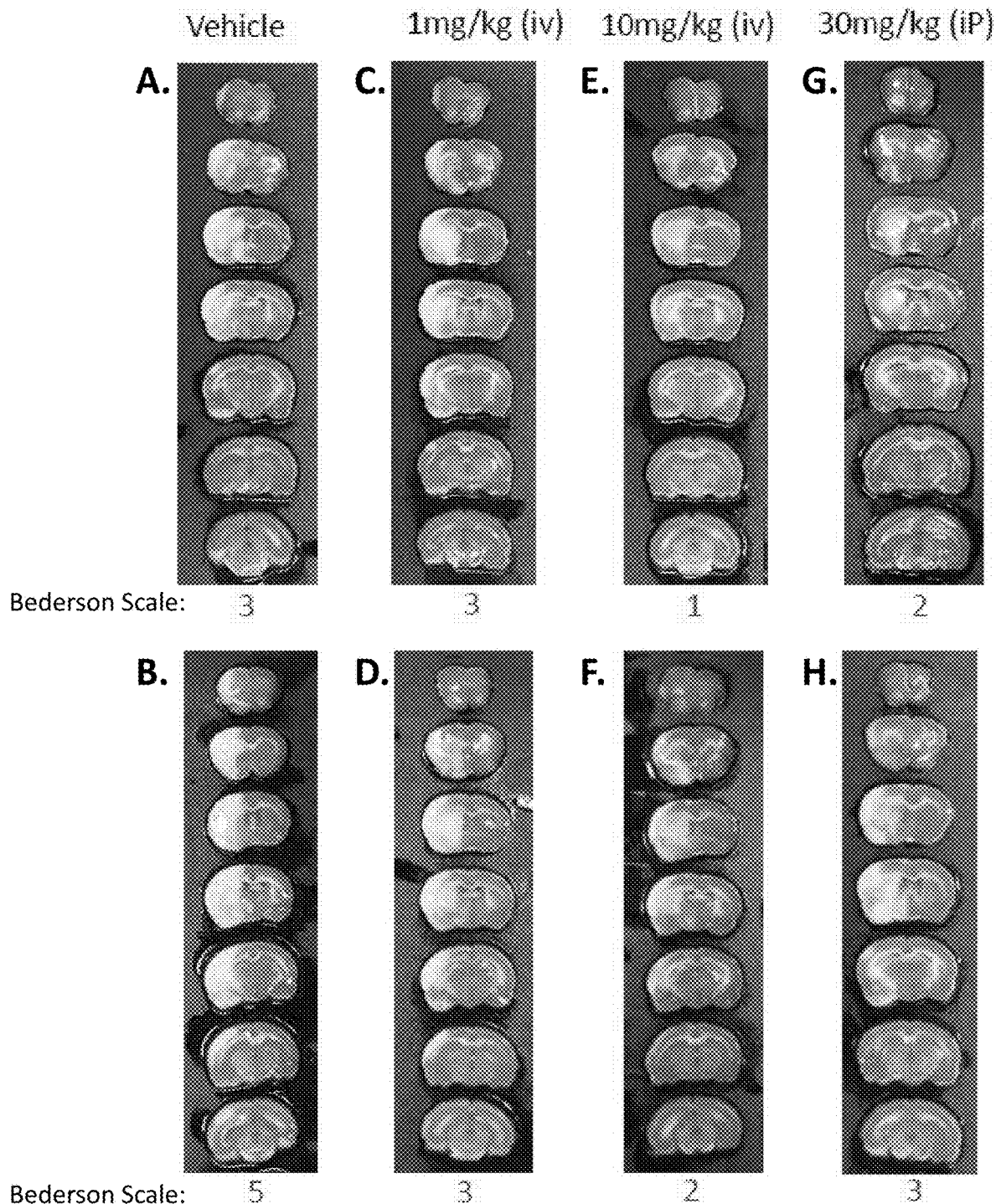
FIGS. 1A-1H show representative images (chosen from the median animal in each group) of triphenyl tetrazolium chloride (TTC)-stained brain coronal sections showing tissue infarction (white color) and normal tissue (red color) in the indicated groups 24 hours after stroke.

Compounds disclosed herein can protect vascular endothelium, including the blood brain barrier, from various insults and can reduce hemorrhage. Presented herein, in some embodiments, are compounds for treating and/or preventing hemorrhage or vascular instability. In certain embodiments, a method herein comprises preventing, reducing a risk of, inhibiting, reducing, mitigating or treating hemorrhage or vascular instability in a subject, wherein the hemorrhage or vascular instability is induced by a thrombolytic therapy or an anticoagulant therapy.

Also presented herein are methods of preventing, reducing a risk of, inhibiting, reducing, mitigating or treating tissue damage due to reperfusion (e.g., reperfusion injury). The mitochondrial permeability transition pore (mPTP) is directly involved in a variety of human diseases. Among them and of particular significance are those caused by the reperfusion injury component of acute ischemia-reperfusion injury (IRI). IRI often causes organ damage, tissue damage and organ or tissue dysfunction and is the leading cause of death and disability worldwide. IRI is often caused by inadequate blood supply to tissue (ischemia) followed by its medically mediated or natural restoration (reperfusion). The reperfusion component of IRI (i.e., reperfusion injury) is estimated to be responsible for up to 50% of the damage to tissues and organs affected by ischemia. Reperfusion of an ischemic tissue often causes damage due to the consequences of re-oxygenation of the cells of such tissues and the mitochondria in such cells. More specifically, in the mitochondria, calcium overload, excessive production of reactive oxygen species (ROS) and changes in the pH in the first few minutes after reperfusion set off a cascade of biochemical changes that result in a protracted opening of the mPTP in the mitochondrial membrane. This can cause a catastrophic collapse of mitochondrial function and cellular death or apoptosis. Reperfusion injury can affect many organs and tissues including the heart, kidneys, lungs, liver, skin flaps, ovaries, intestine, stomach and pancreas. Applicant have determined that the compounds disclosed herein can prevent, mitigate, inhibit and/or treat reperfusion injury.

Compounds

In some embodiments, provided herein are compounds for use in conducting a method disclosed herein. In some embodiments, provided herein are compounds for use in preventing or treating hemorrhage and/or vascular instability in a subject. In certain embodiments, a compound for use herein comprises the structure of Formula I;

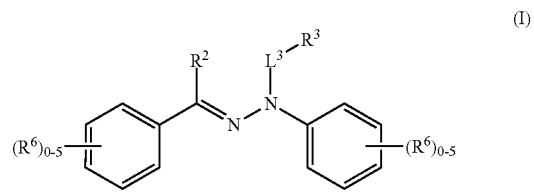

or a pharmaceutically acceptable salt, stereoisomer or tautomer thereof. In some embodiments of Formula I, $R^2$ is hydrogen (H) or methyl; $R^3$ is a methyl, a fluorine substituted alkyl (e.g., fluoromethyl, difluoromethyl, or trifluoromethyl), or a bromine substituted alkyl (e.g., bromomethyl, dibromomethyl, tribromomethyl); $L^3$ is a carbonyl; and $R^6$ at each occurrence is independently selected from alkyl, substituted alkyl, alkenyl, substituted alkenyl, cycloalkyl, substituted cycloalkyl, hydroxyl, methoxy, alkoxy, substituted alkoxy, aryloxy, substituted aryloxy, mercapto, alkylthio, arylthio, carbonyl, carboxyl, aryl, substituted aryl, substituted heterocyclic, halogen, cyano, cyanoalkyl, amine, methyl amine, dimethyl amine, nitro, amino, amidino, carbamate, $CF_3$, $OCF_3$, $S(O)_nR^7$, and $C(O)R^8$, or two $R^6$ at adjacent positions combine to form an optionally substituted heteroaryl or heteroalkyl ring fused with the adjoining phenyl moiety; where $R^7$ is selected from H, $R^9$, $NH_2$, $HNR^9$ and $NR^9R^{10}$; $R^8$ is selected from OH, $OR^9$, $NH_2$, $NHR^9$ and $NR^9R^{10}$; where $R^9$ and $R^{10}$ at each occurrence are independently an optionally substituted alkyl; and n is 1 or 2.

In certain embodiments of Formula I, $R^6$ at each occurrence is independently selected from alkyl, substituted alkyl, alkenyl, substituted alkenyl, hydroxyl, alkoxy, methoxy, substituted alkoxy, halogen, carbonyl, carboxyl, or $C(O)R^8$; and in certain such aspects, $R^6$ at each occurrence is methyl, methoxy, perfluoromethyl, perfluoromethoxy, hydroxyl, Cl, F, or I. In some embodiments of Formula I, $L^3$ is carbonyl, $R^3$ is $CF_3$, $R^2$ is H, and $R^6$ is null or H at every occurrence.

In some embodiments of Formula I, $L^3$ is carbonyl, $R^3$ is $CF_3$, $R^2$ is H, and $R^6$ is independently selected from methyl or methoxy, at each occurrence. In some embodiments of Formula I, $L^3$ is carbonyl, $R^3$ is $CF_3$, $R^2$ is methyl, and $R^6$ is independently selected from methyl or methoxy, at each occurrence.

In some embodiments, a compound for use herein comprises the structure of Formula II;

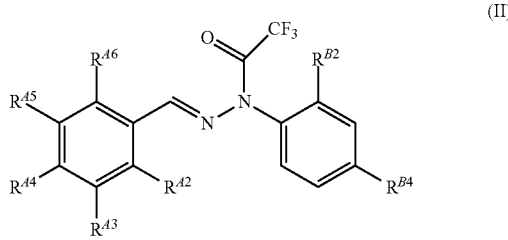

or a pharmaceutically acceptable salt, stereoisomer or tautomer thereof, where:
(i) $R^{A2}$, $R^{A4}$, $R^{A5}$, and $R^{A6}$ is H, $R^{A3}$ is methoxy, $R^{B2}$ is methyl, and $R^{B4}$ is methyl;
(ii) $R^{A2}$, $R^{A3}$, $R^{A5}$, and $R^{A6}$ is H, $R^{A4}$ is methoxy, $R^{B2}$ is methyl, and $R^{B4}$ is methyl;
(iii) $R^{A2}$, $R^{A3}$, $R^{A4}$, $R^{A5}$, and $R^{A6}$ is H, $R^{B2}$ is H, and $R^{B4}$ is H;
(iv) $R^{A2}$, $R^{A3}$, $R^{A4}$, $R^{A5}$, and $R^{A6}$ is H, $R^{B2}$ is methyl, and $R^{B4}$ is methyl;
(v) $R^{A2}$, $R^{A4}$, $R^{A5}$, and $R^{A6}$ is H, $R^{A3}$ is methoxy, $R^{B2}$ is H, and $R^{B4}$ is H;
(vi) $R^{A2}$, $R^{A3}$, $R^{A4}$, $R^{A5}$, and $R^{A6}$ is H, $R^{B2}$ is H, and $R^{B4}$ is methyl;
(vii) $R^{A2}$, $R^{A4}$, $R^{A5}$, and $R^{A6}$ is H, $R^{A3}$ is methoxy, $R^{B2}$ is H, and $R^{B4}$ is methyl;
(viii) $R^{A2}$, $R^{A3}$, $R^{A4}$, $R^{A5}$, and $R^{A6}$ is H, $R^{B2}$ is methyl, and $R^{B4}$ is H;
(ix) $R^{A2}$, $R^{A4}$, $R^{A5}$, and $R^{A6}$ is H, $R^{A3}$ is methoxy, $R^{B2}$ is methyl, and $R^{B4}$ is H;
(x) $R^{A2}$, $R^{A3}$, $R^{A5}$, and $R^{A6}$ is H, $R^{A4}$ is COOH, $R^{B2}$ is methyl, and $R^{B4}$ is methyl;
(xi) $R^{A2}$, $R^{A4}$, and $R^{A5}$ is H, $R^{A3}$ and $R^{A6}$ is hydroxyl, $R^{B2}$ is methyl, and $R^{B4}$ is methyl;
(xii) $R^{A2}$, $R^{A4}$, and $R^{A6}$ is H, $R^{A3}$ and $R^{A5}$ is hydroxyl, $R^{B2}$ is methyl, and $R^{B4}$ is methyl;
(xiii) $R^{A2}$, $R^{A4}$, and $R^{A5}$ is H, $R^{A3}$ is methoxy, $R^{A6}$ is F, $R^{B2}$ is H, and $R^{B4}$ is Cl;
(xiv) $R^{A3}$ and $R^{A5}$ is H, $R^{A2}$ and $R^{A6}$ is F, $R^{A4}$ is hydroxyl, $R^{A6}$ is F, $R^{B2}$ is H, and $R^{B4}$ is F;
(xv) $R^{A2}$, $R^{A4}$, and $R^{A6}$ is H, $R^{A3}$ is hydroxyl, $R^{A5}$ is F, $R^{B2}$ is H, and $R^{B4}$ is F; or
(xvi) $R^{A2}$, $R^{A5}$, and $R^{A6}$ is H, $R^{A3}$ and $R^{A4}$ taken together are —O—$CH_2$—O—, $R^{A5}$ is F, $R^{B2}$ is H, and $R^{B4}$ is F.

In some embodiments of the compound of Formula II, $R^{A2}$, $R^{A5}$, and $R^{A6}$ are H, $R^{A3}$ is methoxy, $R^{B2}$ and $R^{B4}$ are methyl, and $R^{A4}$ is selected from H, $NO_2$, OH, methoxy, phenol, methyl, Fluorine (F), $N(CH_3)_2$, $CHC(CN)_2$ and O-tert-butyldimethylsilyl (OTBDMS). In some embodiments of the compound of Formula II, $R^{A2}$, $R^{A4}$, $R^{A5}$, and $R^{A6}$ are H, $R^{A3}$ is methoxy, $R^{B2}$ is methyl, and $R^{B4}$ is methyl. In some embodiments of the compound of Formula II, $R^{A2}$, $R^{A3}$, $R^{A5}$, and $R^{A6}$ are H, $R^{A4}$ is methoxy, $R^{B2}$ is methyl, and $R^{B4}$ is methyl. In some embodiments of the compound of Formula II, $R^{A2}$, $R^{A3}$, RAH, $R^{A5}$ and $R^{A6}$ are H, $R^{B2}$ is methyl, and $R^{B4}$ is methyl. In some embodiments of the compound of Formula II, $R^{A2}$, $R^{A4}$, $R^{A5}$ and $R^{A6}$ are H, $R^{A3}$ is methoxy, $R^{B2}$ is H, and $R^{B4}$ is H. In some embodiments of the compound of Formula II, $R^{A2}$, $R^{A3}$, $R^{A4}$, $R^{A5}$ and $R^{A6}$ are H, $R^{B2}$ is H, and $R^{B4}$ is methyl. In some embodiments of the compound of Formula II, $R^{A2}$, $R^{A3}$, $R^{A4}$, $R^{A5}$ and $R^{A6}$ are H, $R^{B2}$ is H, and $R^{B4}$ is methyl. In some embodiments of the compound of Formula II, $R^{A2}$, $R^{A4}$, $R^{A5}$ and $R^{A6}$ are H, $R^{A3}$ is methoxy, $R^{B2}$ is H, and $R^{B4}$ is methyl. In some embodiments of the compound of Formula II, $R^{A2}$, $R^{A4}$, $R^{A5}$ and $R^{A6}$ are H, $R^{A3}$ is methoxy, $R^{B2}$ is methyl, and $R^{B4}$ is H. In some embodiments of the compound of Formula II, $R^{A2}$, $R^{A3}$, $R^{A4}$, $R^{A5}$ and $R^{A6}$ are H, $R^{B2}$ is methyl, and $R^{B4}$ is H. In some embodiments of the compound of Formula II, $R^{A2}$, $R^{A3}$, $R^{A5}$ and $R^{A6}$ are H, $R^{A4}$ is a carboxyl, $R^{B2}$ is methyl, and $R^{B4}$ is methyl. In some embodiments of the compound of Formula II, $R^{A2}$, $R^{A4}$, RAS and $R^{A6}$ are H, $R^{A3}$ is a carboxyl, $R^{B2}$ is methyl, and $R^{B4}$ is methyl.

In some embodiments, a compound for use herein comprises the structure of Formula III;

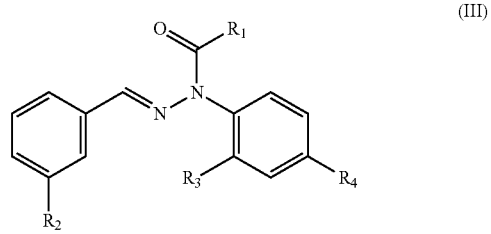

or a pharmaceutically acceptable salt, stereoisomer or tautomer thereof, where $R_1$ is methyl, fluoromethyl, difluoromethyl, trifluoromethyl, bromomethyl, dibromomethyl or tribromomethyl; $R_2$ is methyl, methoxy, hydroxyl, halogen, $CF_3$, $OCH_3$, $OCF_3$ or $OCBr_3$; and $R^3$ and $R^4$ are independently selected from hydrogen, hydroxyl, a halogen (e.g., Cl, F or Br), methyl, a methoxy, and an amine. In some embodiments of Formula III, $R_1$ is $CF_3$ (trifluoromethyl), $R_2$ is $OCH_3$, and $R_3$ and $R_4$ are methyl. In some embodiments of Formula III, $R_1$ is $CF_3$ (trifluoromethyl), $R_2$ is $OCF_3$, and $R_3$ and $R_4$ are methyl.

In some embodiments, a compound for use herein comprises the structure of Formula IV below, or a pharmaceutically acceptable salt, stereoisomer or tautomer thereof.

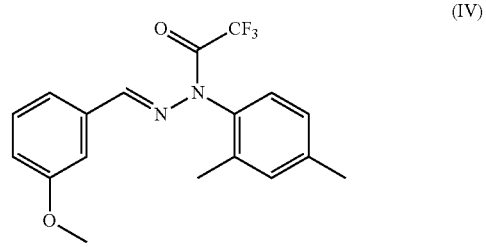 [SMILES: COc1cccc(/C=N/N(C(=O)C(F)(F)F)c2ccc(C)cc2C)c1]

The structure of Formula IV is sometimes referred to herein as "J147".

The following terms have the respective definitions set out below.

"Alkyl" refers to straight or branched chain alkyl radicals having in the range of about 1 up to about 12 carbon atoms (e.g., methyl, ethyl, propyl, butyl, and the like). "Substituted alkyl" refers to alkyl further bearing one or more substituents (e.g., 1, 2, 3, 4, or even 5) as set forth herein. "Optionally substituted alkyl" refers to alkyl or substituted alkyl.

"Cycloalkyl" refers to cyclic ring-containing groups containing in the range of about 3 up to about 12 carbon atoms. "Substituted cycloalkyl" refers to cycloalkyl further bearing one or more substituents (e.g., 1, 2, 3, 4, or even 5) selected from alkyl, substituted alkyl, as well as any of the substituents set forth herein. "Optionally substituted cycloalkyl" refers to cycloalkyl or substituted cycloalkyl.

"Heterocycle," "heterocyclic" and like terms refer to cyclic (i.e., ring-containing) groups containing one or more heteroatoms (e.g., N, O, S, or the like) as part of the ring, and having in the range of 1 up to about 14 carbon atoms. "Substituted heterocyclic" and like terms refer to heterocycle further bearing one or more substituents (e.g., 1, 2, 3, 4, or even 5) as set forth herein. Exemplary heterocyclic moieties include saturated rings, unsaturated rings, and aromatic heteroatom-containing ring systems, e.g., epoxy, tetrahydrofuran, oxazoline, pyrrole, pyridine, furan, and the like. "Optionally substituted heterocycle" and like terms refer to heterocycle or substituted heterocycle.

Reference to "optionally substituted bicyclic ring" refers to a bicyclic ring structure as known in the art, optionally including substitutions as defined herein.

"Alkenyl" refers to straight, branched chain, or cyclic hydrocarbyl groups including from 2 to about 20 carbon atoms having at least one, 1-3, 1-2, or one, carbon to carbon double bond. "Substituted alkenyl" refers to alkenyl substituted at 1 or more, e.g., 1, 2, 3, 4, or even 5 positions, with substitution as described herein. "Optionally substituted alkenyl" refers to alkenyl or substituted alkenyl. In some embodiments, an alkenyl is ethylenyl or propylenyl. In certain embodiments, a substituted alkenyl is a substituted ethylenyl or substituted propylenyl. In some embodiments, ethylenyl or propylenyl is substituted with one or more CN moieties. For example, in some embodiments, a substituted ethylenyl comprises $(CN)_2C=CH-$.

"Aryl" refers to aromatic groups having in the range of 6 up to about 14 carbon atoms. "Substituted aryl" refers to aryl radicals further bearing one or more substituents (e.g., 1, 2, 3, 4, or even 5) selected from alkyl, substituted alkyl, cycloalkyl, substituted cycloalkyl, hydroxyl, alkoxy, aryloxy, mercapto, alkylthio, arylthio, carbonyl, aryl, substituted aryl, heterocyclic, substituted heterocyclic, halogen, trifluoromethyl, pentafluoroethyl, cyano, cyanoalkyl, nitro, amino, amido, amidino, carboxyl, carbamate, $SO_2X$, wherein X is H, R, $NH_2$, NHR or $NR^2$, $SO_3Y$, wherein Y is H, $NH_2$, NHR or $NR^2$, or C(O)Z, wherein Z is OH, OR, $NH_2$, NHR or $NR^2$, and the like. "Optionally substituted aryl" refers to aryl or substituted aryl.

"Aralkyl" refers to an alkyl group substituted by an aryl group. "Substituted aralkyl" refers to aralkyl further bearing one or more substituents (e.g., 1, 2, 3, 4, or even 5) selected from alkyl, substituted alkyl, cycloalkyl, substituted cycloalkyl, as well as any of the substituents set forth herein. Thus, aralkyl groups include benzyl, diphenylmethyl, and 1-phenylethyl ($-CH(C_6H_5)(CH_3)$) among others. "Optionally substituted aralkyl" refers to aralkyl or substituted aralkyl.

"Heteroaryl" refers to aromatic groups containing one or more heteroatoms (e.g., N, O, S, or the like) as part of the aromatic ring, typically having in the range of 2 up to about 14 carbon atoms, and "substituted heteroaryl" refers to heteroaryl radicals further bearing one or more substituents (e.g., 1, 2, 3, 4, or even 5) selected from alkyl, substituted alkyl, cycloalkyl, substituted cycloalkyl, as well as any of the substituents set forth above.

"Heteroaralkyl" and "heteroarylalkyl" refer to an alkyl group substituted by one or more heteroaryl groups. "Substituted heteroaralkyl" refers to heteroaralkyl further bearing one or more substituents (e.g., 1, 2, 3, 4, or even 5) selected from alkyl, substituted alkyl, cycloalkyl, substituted cycloalkyl, as well as any of the substituents set forth herein. "Optionally substituted heteroaralkyl" refers to heteroaralkyl or substituted heteroaralkyl.

"Halogen" and "halo" refer to fluorine, chlorine, bromine or iodine.

"Hydroxyl" and "hydroxy" refer to the functionality —OH.

"Alkoxy" denotes the group —OR, where R is alkyl. "Substituted alkoxy" denotes the group —OR, where R is substituted alkyl. "Optionally substituted alkoxy" refers to alkoxy or substituted alkoxy.

"Aryloxy" denotes the group —OR, where R is aryl. "Substituted aryloxy" denotes the group —OR, where R is substituted aryl. "Optionally substituted aryloxy" refers to aryloxy or substituted aryloxy.

"Mercapto" and "thiol" refer to the functionality —SH.

"Alkylthio" and "thioalkoxy" refer to the group —SR, $-S(O)_{n=1-2}-R$, where R is alkyl. "Substituted alkylthio" and "substituted thioalkoxy" refers to the group —SR, $-S(O)_{n=1-2}-R$, where R is substituted alkyl. "Optionally substituted alkylthio" and "optionally substituted thioalkoxy" refers to alkylthio or substituted alkylthio.

"Arylthio" denotes the group —SR, where R is aryl. "Substituted arylthio" denotes the group —SR, where R is substituted aryl. "Optionally substituted arylthio" refers to arylthio or substituted arylthio.

"Amino" refers to unsubstituted, monosubstituted and disubstituted amino groups, including the substituent $-NH_2$, "monoalkylamino," which refers to a substituent having structure —NHR, wherein R is alkyl or substituted alkyl, and "dialkylamino," which refers to a substituent of the structure $-NR^2$, wherein each R is independently alkyl or substituted alkyl.

"Amidino" denotes the group-$C(=NR^q)NR^rR^s$, wherein $R^q$, $R^r$, and $R^s$ are independently hydrogen or optionally substituted alkyl.

Reference to "amide group" embraces substituents of the structure $-C(O)-NR^2$, wherein each R is independently H, alkyl, substituted alkyl, aryl or substituted aryl as set forth above. When each R is H, the substituent is also referred to as "carbamoyl" (i.e., a substituent having the structure $-C(O)-NH_2$). When only one of the R groups is H, the substituent is also referred to as "monoalkylcarbamoyl" (i.e., a substituent having the structure —C(O)—NHR, wherein R is alkyl or substituted alkyl as set forth above) or "arylcarbamoyl" (i.e., a substituent having the structure —C(O)—NH(aryl), wherein aryl is as defined above, including substituted aryl). When neither of the R groups are H, the substituent is also referred to as "di-alkylcarbamoyl" (i.e., a substituent having the structure $-C(O)-NR^2$, wherein each R is independently alkyl or substituted alkyl as set forth above).

Reference to "carbamate" embraces substituents of the structure $-O-C(O)-NR^2$, wherein each R is independently H, alkyl, substituted alkyl, aryl or substituted aryl.

Reference to "ester group" embraces substituents of the structure —O—C(O)—OR, wherein each R is independently alkyl, substituted alkyl, aryl or substituted aryl.

"Acyl" refers to groups having the structure —C(O)R, where R is hydrogen, alkyl, aryl, and the like as defined herein. "Substituted acyl" refers to acyl wherein the substituent R is substituted as defined herein. "Optionally substituted acyl" refers to acyl and substituted acyl.

"Cyanoalkyl" refers to the group —R≡N, wherein R is an optionally substituted alkylenyl.

As used here, "substitution" denotes an atom or group of atoms that has been replaced with another atom or group of atoms (i.e., substituent), and includes all levels of substitution, e.g. mono-, di-, tri-, tetra-, penta-, or even hex-substitution, where such substitution is chemically permissible. Substitutions can occur at any chemically accessible position and on any atom, such as substitution(s) on carbon and any heteroatom, such as oxygen, nitrogen, or sulfur. For example, substituted moieties include those where one or more bonds to a hydrogen or carbon atom(s) contained therein are replaced by a bond to non-hydrogen and/or non-carbon atom(s). Substitutions can include, but are not limited to, a halogen atom such as F, Cl, Br, and I; an oxygen atom in groups such as hydroxyl groups, alkoxy groups, aryloxy groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and heteroatoms in other groups as well known in the art.

Non-limiting examples of substituents include, without limitation, halogen, —OH, —NH$_2$, —NO$_2$, —CN, —C(O)OH, —C(S)OH, —C(O)NH$_2$, —C(S)NH$_2$, —S(O)$_2$NH$_2$, —NHC(O)NH$_2$, —NHC(S)NH$_2$, —NHS(O)$_2$NH$_2$, —C(NH)NH$_2$, —OR, —SR, —OC(O)R, —OC(S)R, —C(O)R, —C(S)R, —C(O)OR, —C(S)OR, —S(O)R, —S(O)$_2$R, —C(O)NHR, —C(S)NHR, —C(O)NRR, —C(S)NRR, —S(O)$_2$NHR, —S(O)$_2$NRR, —C(NR)NHR, —C(NH)NRR, —NHC(O)R, —NHC(S)R, —NRC(O)R, —NRC(S)R, —NHS(O)$_2$R, —NRS(O)$_2$R, —NHC(O)NHR, —NHC(S)NHR, —NRC(O)NH$_2$, —NRC(S)NH$_2$, —NRC(O)NHR, —NRC(S)NHR, —NHC(O)NRR, —NHC(S)NRR, —NRC(O)NRR, —NRC(S)NRR, —NHS(O)$_2$NHR, —NRS(O)$_2$NH$_2$, —NRS(O)$_2$NHR, —NHS(O)$_2$NRR, —NRS(O)$_2$NRR, —NHR, —NRR, where R at each occurrence is independently H, optionally substituted alkyl, optionally substituted aryl, or optionally substituted heteroaryl. Also contemplated is substitution with an optionally substituted hydrocarbyl moiety containing one or more of the following chemical functionalities: —O—, —S—, —NR—, —O—C(O)—, —O—C(O)—O—, —O—C(O)—NR—, —NR—C(O)—, —NR—C(O)—O—, —NR—C(O)—NR—, —S—C(O)—, —S—C(O)—O—, —S—C(O)—NR—, —S(O)—, —S(O)$_2$—, —O—S(O)$_2$—, —O—S(O)$_2$—O, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)$_2$—NR—, —S(O)$_2$—NR—, —O—NR—S(O)$_2$—O—, —O—P(O)R$_2$—, —S—P(O)R$_2$—, or —NRP(O)R$_2$—, where R at each occurrence is independently H, optionally substituted alkyl, optionally substituted aryl, or optionally substituted heteroaryl.

In some embodiments, a compound for use herein includes isomers including stereoisomers (e.g., enantiomer and diastereomers), constitutional isomers, tautomers, conformational isomers, and geometric isomers of a compound disclosed herein.

Exemplary constitutional isomers include for example without limitation, isomers resulting from different connectivity of functionalities forming the compounds disclosed herein, for example, 1-propyl versus 2-propyl substitution, and the like. Constitutional isomers in combination with tautomerization additionally embrace bonding rearrangements involving the migration of double bonds and substituents. For example, tautomerization in combination with a 1-3 pleiotropic hydrogen shift can result in constitutional isomerism.

Exemplary conformational isomers include for example without limitation, isomers produced by rotation about a bond wherein the rotation is hindered to the extent that separable isomers result, as well known in the art.

Exemplary geometrical isomers include double bonds in e.g., the "E" or "Z" configuration, as well known in the art.

Compounds disclosed herein can be readily prepared using a suitable synthetic method. For example 3-methoxy benzaldehyde can be condensed with 2,4-dimethylphenyl hydrazine in methanol employing standard hydrazone preparation conditions (e.g., heating in the microwave to speed the reaction time). Next, the free NH is acylated with TFAA (trifluoroacetic anhydride) plus catalytic (0.1%) amounts of DMAP (dimethylamino pyridine), THE (tetrahydrofuran) or DCM (dichloromethane).

In some embodiments, a compound for use herein is provided in the form of pharmaceutically acceptable salt. A compound for use herein can be complexed with any suitable inorganic or organic salt using a suitable method. In some embodiments, a salt of a compound for use herein is prepared by reacting the compound with a suitable organic or inorganic acid or base. Non-limiting examples of organic salts contemplated for use herein include methanesulfonate, acetate, oxalate, adipate, alginate, aspartate, valerate, oleate, laurate, borate, benzoate, lactate, phosphate, toluenesulfonate (tosylate), citrate, malate, maleate, fumarate, succinate, tartrate, napsylate, methanesulfonate, 2-naphthalenesulfonate, nicotinate, benzenesulfonate, butyrate, camphorate, camphorsulfonate, cyclopentanepropionate, digluconate, dodecylsulfate, glucoheptanoate, glycerophosphate, heptanoate, hexanoate, undecanoate, 2-hydroxyethanesulfonate, ethane sulfonate, and the like. In some embodiments, inorganic salts can be formed from inorganic acids such as sulfate, bisulfate, hemisulfate, hydrochloride, chlorate, perchlorate, hydrobromide, hydroiodide, and the like. Non-limiting examples of a base salt include ammonium salts; alkali metal salts such as sodium salts, potassium salts, and the like; alkaline earth metal salts such as calcium salts, magnesium salts, and the like; salts with organic bases such as dicyclohexylamine salts, N-methyl-D-glucamine, phenylethylamine, and the like; and salts with amino acids such as arginine, lysine, and the like.

Accordingly, in certain embodiments, a method herein comprises administering a therapeutically effective amount of a compound of Formula I, II, III or IV to a subject.

Hemorrhage and Vasculature Instability

Presented herein are methods of preventing, reducing a risk of, inhibiting, reducing, mitigating, and/or treating hemorrhage and vascular instability. In some embodiments, methods are described herein for preventing, reducing a risk of, inhibiting, reducing, mitigating, and/or treating hemorrhage and/or vasculature instability that is induced by a thrombolytic therapy, an anticoagulant therapy, and/or an endovascular intervention therapy.

Hemorrhage

In certain embodiments, a method comprises preventing, reducing a risk of, inhibiting, reducing, mitigating, and/or treating hemorrhage which method, in certain embodiments, comprises administering a therapeutically effective amount of a compound disclosed herein to a subject who has, is suspected of having, or is at risk of having a hemorrhage.

In certain embodiments, a hemorrhage is an internal hemorrhage or an external hemorrhage. In some embodiments, hemorrhage is an internal hemorrhage (e.g., internal bleeding), for example where the hemorrhage is not visible and/or is located and/or contained inside the body of the subject. Non-limiting examples of internal hemorrhage include internal bleeding into the chest, abdomen, neck, retroperitoneal space, pelvis, uterus, liver, heart, limbs, head, brain, tissues thereof and the like. In some embodiments, hemorrhage comprises or consists of myocardial hemorrhage. Accordingly, in some embodiments, a method comprises preventing, reducing a risk of, inhibiting, reducing, mitigating, and/or treating myocardial hemorrhage. In some embodiments, hemorrhage comprises or consists of cerebral hemorrhage or brain hemorrhage. Accordingly, in some embodiments, a method comprises preventing, reducing a risk of, inhibiting, reducing, mitigating, and/or treating cerebral or brain hemorrhage. In some embodiments, a hemorrhage comprises an intracerebral hemorrhage or intracranial hemorrhage. Accordingly, in some embodiments, a method comprises preventing, reducing a risk of, inhibiting, reducing, mitigating, and/or treating an intracerebral hemorrhage or intracranial hemorrhage.

Internal hemorrhage may result from one or more disorders, complications or conditions, non-limiting examples of which include rupture of a blood vessel, for example, due to high blood pressure, an aneurysm, varices, an ulcer (e.g., a peptide ulcer), ectopic pregnancy, surgery, a medical procedure, trauma, combinations thereof and the like. In certain embodiments, an internal hemorrhage results from or is associated with a cancer, hematologic disease, vitamin K deficiency, or a virus-induced hemorrhagic fever.

In some embodiments, hemorrhage is induced by a thrombolytic therapy, an anticoagulant therapy, and/or an endovascular intervention therapy. In certain embodiments, a hemorrhage that is induced by a thrombolytic therapy, an anticoagulant therapy, and/or an endovascular intervention therapy is a hemorrhage that is caused by (directly or indirectly), worsened by, aggravated by, exacerbated by, and/or magnified by a thrombolytic therapy, an anticoagulant therapy, and/or an endovascular intervention therapy. Compounds disclosed herein can prevent, inhibit, mitigate, reduce the extent of, or delay the onset of hemorrhage that is caused by (directly or indirectly), worsened by, aggravated by, exacerbated by, and/or magnified by a thrombolytic therapy, an anticoagulant therapy, an anti-platelet drug, an anti-inflammatory drug, or an endovascular intervention therapy. In certain embodiments, a hemorrhage that is induced by a thrombolytic therapy, an anticoagulant therapy, and/or an endovascular intervention therapy is a hemorrhage that is observed, diagnosed, or suspected to be present during or after administration of a thrombolytic therapy, an anticoagulant therapy, and/or an endovascular intervention therapy. In certain embodiments, a hemorrhage that is induced by an anti-platelet drug or anti-inflammatory drug is a hemorrhage that is observed, diagnosed, or suspected to be present during or after administration of an anti-platelet drug or anti-inflammatory drug. A hemorrhage may be diagnosed by a suitable method, non-limiting examples of which include a CT scan, MRI scan or angiogram.

A hemorrhage may be an acute hemorrhage or chronic hemorrhage. A hemorrhage may be mild, moderate or severe. In some embodiment, a hemorrhage is a Class I, II, III or IV hemorrhage. In some embodiments, a Class I hemorrhage is classified, in part, by an estimation of blood loss that is less than ≤15% of total blood volume. In certain embodiments, a method herein comprises preventing, reducing a risk of, inhibiting, reducing, mitigating, and/or treating hemorrhage where the hemorrhage is a Class I hemorrhage, or where the estimated blood loss due to the hemorrhage is equal to or less than 15%, 10%, 5%, 2%, or 1% of total blood volume.

In certain embodiments, a method of inhibiting, reducing, mitigating, and/or treating hemorrhage comprises reducing hemorrhage volume. A method herein may reduce hemorrhage volume by at least 1%, at least 2%, at least 5%, at least 10%, at least 20%, at least 50%, at least 75%, or by at least 90%. In certain embodiments, a method herein may reduce hemorrhage volume by 1% to 100%, 1% to 75%, 1% to 50%, 1% to 25%, 1% to 20%, 1% to 10% or by 1% to 5%.

In some embodiments, hemorrhage comprises or consists of hemorrhage transformation. In some embodiments, hemorrhage transformation comprises hemorrhage transformation in the brain (e.g., cerebral hemorrhage transformation). Accordingly, in some embodiments, a method of preventing, reducing a risk of, inhibiting, reducing, mitigating, and/or treating hemorrhage comprises a method of preventing, reducing a risk of, inhibiting, reducing, mitigating, and/or treating hemorrhage transformation. In some embodiments, a method comprises preventing, reducing a risk of, inhibiting, reducing, mitigating, and/or treating hemorrhage transformation induced by a thrombolytic therapy, an anticoagulant therapy, and/or an endovascular intervention therapy.

Vascular Instability

Presented herein are methods of preventing, reducing a risk of, inhibiting, reducing, mitigating, and/or treating vascular instability which methods, in certain embodiments, comprise administering a therapeutically effective amount of a compound disclosed herein to a subject who has, is suspected of having or is at risk of having vascular instability. In some embodiments, a method of preventing vascular instability comprises protecting vascular endothelium and/or a blood brain barrier from damage or injury.

In some embodiments, vascular instability comprises endothelial dysfunction, non-limiting examples of which include a reduction or loss of vascular tone, a reduction or loss of hemostasis, edema (e.g., localized swelling), damage and/or dysfunction of the vascular endothelium, damage or disruption of the blood brain barrier, the like and combinations thereof. In some embodiments, vascular instability comprises edema. In some embodiments, edema is cerebral edema. In some embodiments, edema comprises swelling of the blood brain barrier.

In some embodiments, vascular instability comprises reperfusion injury. In some embodiments, reperfusion injury comprises damage to, or injury of, the vascular endothelium due to reperfusion. In some embodiments, vascular instability comprises injury of the vascular endothelium due to reperfusion (e.g., reperfusion induced by a thrombolytic therapy, an anticoagulant therapy, and/or an endovascular intervention therapy; e.g., reperfusion injury). In some embodiments, vascular instability comprises damage and/or dysfunction of the blood brain barrier. Damage to and/or dysfunction of the blood brain barrier may also result from reperfusion. In some embodiments, a method of treating vascular instability comprises stabilizing vascular endothelium and/or stabilizing a blood brain barrier during or after reperfusion, and/or during or after administration of a thrombolytic therapy, an anticoagulant therapy, and/or an endovascular intervention therapy. Accordingly, in some embodiments, a method comprises preventing, reducing a risk of, inhibiting, reducing, mitigating, and/or treating damage to and/or dysfunction of a blood brain barrier where the damage or dysfunctions is induced by a thrombolytic therapy, an anticoagulant therapy, and/or an endovascular intervention therapy.

Thrombolytic, Anti-Coagulant and Endovascular Therapy

In certain embodiments, a hemorrhage or vascular instability is induced by, caused by (directly or indirectly), worsened by, aggravated by, exacerbated by, and/or magnified by administration (e.g., including self-administration) of one or more of a thrombolytic therapy, an anticoagulant therapy, an antiplatelet drug, an anti-inflammatory drug or an endovascular intervention, which therapies may be administered individually or in combination. Accordingly, in some embodiments, a method herein comprises preventing, reducing a risk of, inhibiting, reducing, mitigating or treating hemorrhage or vascular instability in a subject, wherein the hemorrhage or vascular instability is induced by, caused by (directly or indirectly), worsened by, aggravated by, exacerbated by, and/or magnified by administration (e.g., including self-administration) of one or more of a thrombolytic therapy, an anticoagulant therapy, an antiplatelet drug, an anti-inflammatory or an endovascular intervention, where the method comprises administering to the subject a therapeutically effective amount of a compound described herein.

In certain embodiments, a hemorrhage or vascular instability is induced by, caused by (directly or indirectly), worsened by, aggravated by, exacerbated by, and/or magnified by a thrombolytic therapy (e.g., a thrombolytic therapy administered to a subject). Accordingly, in certain embodiments, a method comprises administering a compound disclosed herein to a subject before, during or after a subject is administered a thrombolytic therapy. A thrombolytic therapy often comprises a drug or therapy that is administered to a subject to break up or dissolve a blood clot. Non-limiting examples of thrombolytic therapy include administration of a tissue plasminogen activator (TPA), a streptokinase, a streptokinase activator or a urokinase to a subject. Thrombolytic drugs may comprise recombinantly expressed proteins. Non-limiting examples of TPA include alteplase (Activase), reteplase (Retavase), or tenecteplase (TNKase, Metalyse). In some embodiments, a streptokinase activator is an anisoylated plasminogen streptokinase activator complex. Non-limiting examples of an anisoylated plasminogen streptokinase activator complex include anistreplase or eminase. In some embodiments, a urokinase is a urokinase-type plasminogen activator. An example of a urokinase-type plasminogen activator is saruplase.

In certain embodiments, a hemorrhage or vascular instability is induced by, caused by (directly or indirectly), worsened by, aggravated by, exacerbated by, and/or magnified by an anticoagulant therapy (e.g., an anticoagulant administered to a subject). Accordingly, in certain embodiments, a method comprises administering a compound disclosed herein to a subject before, during or after a subject is administered an anticoagulant therapy. An anticoagulant therapy is often a drug or therapy that is administered to a subject to inhibit or prevent blood clot formation. Non-limiting examples of an anticoagulant therapy include administration of a vitamin K antagonist, a thrombin inhibitor, a Factor Xa inhibitor, heparin, a low molecular weight heparin, derivatives thereof, and the like. Non-limiting examples of a vitamin K antagonist include warfarin, acenocoumarol, coumatetralyl, dicoumarol, ethyl biscoumacetate, phenprocoumon, atromentin, clorindione, diphenadione, phenindione and tioclomarol. Non-limiting examples of a thrombin inhibitors include hirudins, bivalirudin, argatroban, dabigatran, Efegatran, inogatran, melagatran, ximelagatran, desirudin, lepirudin and antithrombin III. Non-limiting examples of a Factor Xa inhibitor include low molecular weight heparins (e.g., bemiparin, certoparin, dalteparin, enoxaparin, nadroparin, pamaparin, reviparin, and tinzaparin), apixaban (Eliquis), betrixaban, darexaban, otamixaban, fondaparinux, rivaroxaban (Xarelto), edoxaban (Lixiana), etmixaan, fondaparinux, idraparinux, and heparinoids (e.g., danaparioid, dermatan sulfate and sulodexide). Non-limiting examples of heparin, low molecular weight heparins and heparin derivatives include enoxaparin, dalteparin, tinzaparin and danaparoid. Other non-limiting examples of anti-coagulants include dabigatran (Pradaxa), batroxobin, hementin, clopidogrel, ticlopidine, prasugrel, ticagrelor, and aspirin.

In certain embodiments, a hemorrhage or vascular instability is induced by, caused by (directly or indirectly), worsened by, aggravated by, exacerbated by, and/or magnified by an antiplatelet drug, non-limiting examples of which include a glycoprotein IIb/IIIa inhibitor (e.g., abciximab, eptifibatide, orbofiban, roxifiban, sibrafiban and tirofiban), an ADP receptor/P2Y$_{12}$ inhibitor (e.g., thienopyridines (e.g., clopidogrel, prasugrel and ticlopidine) and nucleotide/nucleoside analogs (e.g., cangrelor, elinogrel and ticagrelor)), a prostaglandin analogue (PGI2)(e.g., beraprost, iloprost, prostacyclin and treprostinil), a cyclooxygenase (COX) inhibitor (e.g., acetylsalicylic acid/aspirin, aloxiprin, carbasalate calcium, indobufen and triflusal), a thromboxane inhibitor (e.g., thromboxane synthase inhibitors (e.g., dipyridamole, picotamide and terbogrel), receptor antagonists (e.g., terbogrel and terutroban)), cloricromen, ditazole and vorapaxar.

In certain embodiments, a hemorrhage or vascular instability is induced by, caused by (directly or indirectly), worsened by, aggravated by, exacerbated by, and/or magnified by an anti-inflammatory drug, non-limiting examples of which include ibuprofen, naproxen, diclofenac, celecoxib, mefenamic acid, etoricoxib, and indomethacin.

In certain embodiments, a hemorrhage or vascular instability is induced by, caused by (directly or indirectly), worsened by, aggravated by, exacerbated by, and/or magnified by an endovascular intervention therapy. A non-limiting example of an endovascular intervention therapy includes mechanical thrombectomy.

Subjects

The term "subject" refers to a mammal. Any suitable mammal can be treated by a method or composition described herein. Non-limiting examples of mammals include a human, non-human primate (e.g., ape, gibbons, chimpanzees, orangutans, monkeys, macaques, and the like), domestic animals (e.g., dogs and cats), farm animals (e.g., horses, cows, goats, sheep, pigs) and experimental animals (e.g., mouse, rat, rabbit, guinea pig). In some embodiments a subject is a non-human primate or a human. In some embodiments a subject is a human. A subject can be any age or at any stage of development (e.g., an adult, teen, child, infant, or a mammal in utero). A subject can be male or female.

In some embodiments, a subject has, is suspected of having, or is at risk of having a hemorrhage and vascular instability. In certain embodiments, a subject at risk of having a hemorrhage or vascular instability is a subject who is being administered, who has been administered or who will be administered a thrombolytic, anti-coagulant or endovascular intervention therapy. In certain embodiments, a subject at risk of having a hemorrhage or vascular instability is a subject who is being administered, who has been administered or who will be administered a tissue plasminogen activator (TPA). In certain embodiments, a subject is scheduled to receive or is about to receive a thrombolytic, anti-coagulant or endovascular intervention therapy.

In some embodiments a subject has, or is suspected of having a blood clot (i.e., thrombus) or thrombosis (e.g., obstruction of a blood vessel by a blood clot). In some embodiments a subject has, or is suspected of having a venous thrombosis or deep vein thrombosis. In some embodiments a subject has, or is suspected of having a blood clot or thrombosis and is administered, or is scheduled to be administered a thrombolytic therapy (e.g., TPA). In some embodiments a subject has, or is suspected of having a venous thrombosis or deep vein thrombosis and is administered, or is scheduled to be administered a thrombolytic therapy.

In some embodiments a subject has, or is suspected of having an ischemic stroke and is administered, or is scheduled to be administered a thrombolytic therapy. In some embodiments a subject has, or is suspected of having an ischemic stroke and is administered, or is scheduled to be administered TPA.

Pharmaceutical Compositions

In some embodiments, a composition or pharmaceutical composition comprises a compound disclosed herein. In some embodiments, a composition or pharmaceutical composition comprises a therapeutically effective amount of a compound disclosed herein. In some embodiments, a composition or pharmaceutical composition comprises a compound disclosed herein in an amount in a range of 1 µg to 1000 mg, 1 µg to 100 mg, or 10 µg to 100 µg. In some embodiments provided herein is a pharmaceutical composition comprising a compound disclosed herein for use in conducting a method described herein. In some embodiments, a pharmaceutical composition comprises a compound disclosed herein and a pharmaceutically acceptable excipient, diluent, additive or carrier.

A pharmaceutical composition can be formulated for a suitable route of administration. In some embodiments a pharmaceutical composition is formulated for oral, subcutaneous (s.c.), intradermal, intramuscular, intraperitoneal and/or intravenous (i.v.) administration. In certain embodiments, a pharmaceutical composition contains formulation materials for modifying, maintaining, or preserving, for example, the pH, osmolarity, viscosity, clarity, color, isotonicity, odor, sterility, stability, rate of dissolution or release, adsorption or penetration of the composition. In certain embodiments, suitable formulation materials include, but are not limited to, amino acids (such as glycine, glutamine, asparagine, arginine or lysine); antimicrobials; antioxidants (such as ascorbic acid, sodium sulfite or sodium hydrogen-sulfite); buffers (such as borate, bicarbonate, Tris-HCl, citrates, phosphates (e.g., phosphate buffered saline) or suitable organic acids); bulking agents (such as mannitol or glycine); chelating agents (such as ethylenediamine tetraacetic acid (EDTA)); complexing agents (such as caffeine, polyvinylpyrrolidone, beta-cyclodextrin or hydroxypropyl-beta-cyclodextrin); proteins (such as serum albumin, gelatin or immunoglobulins); coloring, flavoring and diluting agents; emulsifying agents; hydrophilic polymers (such as polyvinylpyrrolidone); low molecular weight polypeptides; salt-forming counter ions (such as sodium); solvents (such as glycerin, propylene glycol or polyethylene glycol); diluents; excipients and/or pharmaceutical adjuvants. In particular, a pharmaceutical composition can comprise any suitable carrier, formulation, or ingredient, the like or combinations thereof as listed in "Remington: The Science And Practice Of Pharmacy" Mack Publishing Co., Easton, PA, 19th Edition, (1995)(hereafter, Remington '95), or "Remington: The Science And Practice Of Pharmacy", Pharmaceutical Press, Easton, PA, $22^{nd}$ Edition, (2013)(hereafter, Remington 2013), the contents of which are incorporated herein by reference in their entirety.

In certain embodiments, a pharmaceutical composition comprises a suitable excipient, non-limiting examples of which include anti-adherents (e.g., magnesium stearate), a binder, fillers, monosaccharides, disaccharides, other carbohydrates (e.g., glucose, mannose or dextrin), sugar alcohols (e.g., mannitol or sorbitol), coatings (e.g., cellulose, hydroxypropyl methylcellulose (HPMC), microcrystalline cellulose, synthetic polymers, shellac, gelatin, corn protein zein, enterics or other polysaccharides), starch (e.g., potato, maize or wheat starch), silica, colors, disintegrants, flavors, lubricants, preservatives, sorbents, sweeteners, vehicles, suspending agents, surfactants and/or wetting agents (such as pluronics, PEG, sorbitan esters, polysorbates such as polysorbate 20, polysorbate 80, triton, tromethamine, lecithin, cholesterol, tyloxapal), stability enhancing agents (such as sucrose or sorbitol), and tonicity enhancing agents (such as alkali metal halides, sodium or potassium chloride, mannitol, sorbitol), and/or any excipient disclosed in Remington '95 or Remington 2013. The term "binder" as used herein refers to a compound or ingredient that helps keeps a pharmaceutical mixture combined. Suitable binders for making pharmaceutical formulations and are often used in the preparation of pharmaceutical tablets, capsules and granules are known to those skilled in the art.

In some embodiments a pharmaceutical composition comprises a suitable pharmaceutically acceptable additive and/or carrier. Non-limiting examples of suitable additives include a suitable pH adjuster, a soothing agent, a buffer, a sulfur-containing reducing agent, an antioxidant and the like. Non-limiting examples of a sulfur-containing reducing agent include those having a sulfhydryl group (e.g., a thiol) such as N-acetylcysteine, N-acetylhomocysteine, thioctic acid, thiodiglycol, thioethanolamine, thioglycerol, thiosorbitol, thioglycolic acid and a salt thereof, sodium thiosulfate, glutathione, and a C1-C7 thioalkanoic acid. Non-limiting examples of an antioxidant include erythorbic acid, dibutylhydroxytoluene, butylhydroxyanisole, alpha-tocopherol, tocopherol acetate, L-ascorbic acid and a salt thereof, L-ascorbyl palmitate, L-ascorbyl stearate, sodium bisulfite, sodium sulfite, triamyl gallate and propyl gallate, as well as chelating agents such as disodium ethylenediaminetetraacetate (EDTA), sodium pyrophosphate and sodium metaphosphate. Furthermore, diluents, additives and excipients may comprise other commonly used ingredients, for example, inorganic salts such as sodium chloride, potassium chloride, calcium chloride, sodium phosphate, potassium phosphate and sodium bicarbonate, as well as organic salts such as sodium citrate, potassium citrate and sodium acetate.

The pharmaceutical compositions used herein can be stable over an extended period of time, for example on the order of months or years. In some embodiments a pharmaceutical composition comprises one or more suitable preservatives. Non-limiting examples of preservatives include benzalkonium chloride, benzoic acid, salicylic acid, thimerosal, phenethyl alcohol, methylparaben, propylparaben, chlorhexidine, sorbic acid, hydrogen peroxide, the like and/or combinations thereof. A preservative can comprise a quaternary ammonium compound, such as benzalkonium chloride, benzoxonium chloride, benzethonium chloride, cetrimide, sepazonium chloride, cetylpyridinium chloride, or domiphen bromide (BRADOSOL®). A preservative can comprise an alkyl-mercury salt of thiosalicylic acid, such as thimerosal, phenylmercuric nitrate, phenylmercuric acetate or phenylmercuric borate. A preservative can comprise a paraben, such as methylparaben or propylparaben. A preservative can comprise an alcohol, such as chlorobutanol, benzyl alcohol or phenyl ethyl alcohol. A preservative can comprise a biguanide derivative, such as chlorohexidine or polyhexamethylene biguanide. A preservative can comprise sodium perborate, imidazolidinyl urea, and/or sorbic acid. A preservative can comprise stabilized oxychloro complexes, such as known and commercially available under the trade name PURITE®. A preservative can comprise polyglycol-polyamine condensation resins, such as known and commercially available under the trade name POLYQUART® from Henkel KGaA. A preservative can comprise stabilized hydrogen peroxide. A preservative can be benzalkonium chloride. In some embodiments a pharmaceutical composition is free of preservatives.

In some embodiments a composition, pharmaceutical composition or compound disclosed herein is substantially free of contaminants (e.g., blood cells, platelets, polypeptides, minerals, blood-borne compounds or chemicals, virus, bacteria, other pathogens, toxin, and the like). In some embodiments a composition, pharmaceutical composition or compound disclosed herein is substantially free of serum and serum contaminants (e.g., serum proteins, serum lipids, serum carbohydrates, serum antigens and the like). In some embodiments a composition, pharmaceutical composition or compound disclosed herein is substantially free of a pathogen (e.g., a virus, parasite or bacteria). In some embodiments a composition, pharmaceutical composition or compound disclosed herein is substantially free of endotoxin. In some embodiments a composition, pharmaceutical composition or compound disclosed herein is sterile. In certain embodiments, a composition or pharmaceutical composition disclosed herein comprises a compound of Formula I, II, III or IV.

The pharmaceutical compositions described herein may be configured for administration to a subject in any suitable form and/or amount according to the therapy in which they are employed. For example, a pharmaceutical composition configured for parenteral administration (e.g., by injection or infusion), may take the form of a suspension, solution or emulsion in an oily or aqueous vehicle and it may contain formulation agents, excipients, additives and/or diluents such as aqueous or non-aqueous solvents, co-solvents, suspending solutions, preservatives, stabilizing agents and or dispersing agents. In some embodiments a pharmaceutical composition suitable for parenteral administration may contain one or more excipients. In some embodiments a pharmaceutical composition is lyophilized to a dry powder form. In some embodiments a pharmaceutical composition is lyophilized to a dry powder form, which is suitable for reconstitution with a suitable pharmaceutical solvent (e.g., water, saline, an isotonic buffer solution (e.g., PBS), DMSO, combinations thereof and the like). In certain embodiments, reconstituted forms of a lyophilized pharmaceutical composition are suitable for parenteral administration (e.g., intravenous administration) to a mammal.

In certain embodiments, a pharmaceutical composition is configured for oral administration and may be formulated as a tablet, microtablet, minitablets, micropellets, powder, granules, capsules (e.g., capsules filled with microtablets, micropellets, powders or granules), emulsions, solutions, the like or combinations thereof. Pharmaceutical compositions configured for oral administration may comprise suitable coatings to delay or sustain release of the active ingredient, non-limiting examples of which include enteric coatings such as fatty acids, waxes, shellac, plastics, methyl acrylate-methacrylic acid copolymers, cellulose acetate phthalate (CAP), cellulose acetate succinate, hydroxypropyl methyl cellulose phthalate, hydroxypropyl methyl cellulose acetate succinate (hypromellose acetate succinate), polyvinyl acetate phthalate (PVAP), methyl methacrylate-methacrylic acid copolymers, cellulose acetate trimellitate, sodium alginate, zein, plant fibers, the like and combinations thereof.

In some embodiments a pharmaceutical compositions described herein may be configured for topical administration and may include one or more of a binding and/or lubricating agent, polymeric glycols, gelatins, cocoa-butter or other suitable waxes or fats. In some embodiments a pharmaceutical composition described herein is incorporated into a topical formulation containing a topical carrier that is generally suited to topical drug administration and comprising any suitable material known to those skilled in the art. In certain embodiments, a topical formulation of a pharmaceutical composition is formulated for administration of a compound using a topical patch.

In certain embodiments, an optimal pharmaceutical composition is determined by one skilled in the art depending upon, for example, on the intended route of administration, delivery format and desired dosage (see e.g., Remington '95 or Remington 2013, supra). A pharmaceutical composition can be manufactured by any suitable manner, including, e.g., by means of conventional mixing, dissolving, granulating, dragee-making, levigating, emulsifying, encapsulating, entrapping or tableting processes (e.g., see methods described in Remington '95 or Remington 2013).

Route of Administration

A suitable method of administering a composition, pharmaceutical composition or compound disclosed herein to a subject can be used. A suitable formulation and/or route of administration can be used for administration of a compound disclosed herein or composition disclosed herein (e.g., see Fingl et al. 1975, in "The Pharmacological Basis of Therapeutics", which is incorporated herein by reference in its entirety). A suitable formulation and/or route of administration can be chosen by a medical professional (e.g., a physician) in view of, for example, a subject's risk, age, and/or condition. Non-limiting examples of routes of administration include topical or local (e.g., transdermally or cutaneously, (e.g., on the skin or epidermis), in or on the eye, intranasally, transmucosally, in the ear, inside the ear (e.g., behind the ear drum)), enteral (e.g., delivered through the gastrointestinal tract, e.g., orally (e.g., as a tablet, capsule, granule, liquid, emulsification, lozenge, or combination thereof), sublingual, by gastric feeding tube, rectally, and the like), by parenteral administration (e.g., parenterally, e.g., intravenously, intra-arterially, intramuscularly, intraperitoneally, intradermally, subcutaneously, intracavity, intracranial, intra-articular, into a joint space, intracardiac (into the heart), intracavernous injection, intralesional (into a skin lesion), intraosseous infusion (into the bone marrow), intrathecal (into the spinal canal), intrauterine, intravaginal, intravesical infusion, intravitreal), the like or combinations thereof.

In some embodiments a compound disclosed herein or pharmaceutical composition described herein is administered to the lungs, bronchial passages, trachea, esophagus, sinuses, or nasal passages using a suitable method, non-limiting examples of which include intranasal administration, intratracheal instillation, and oral inhalative administration (e.g., by use of an inhaler, e.g., single/-multiple dose dry powder inhalers, nebulizers, and the like).

In some embodiments a compound disclosed herein or a pharmaceutical composition disclosed herein is provided to a subject. For example, a composition that is provided to a subject is sometimes provided to a subject for self-administration or for administration to a subject by another (e.g., a non-medical professional). As another example, a composition can be provided as an instruction written by a medical practitioner that authorizes a patient to be provided a composition or treatment described herein (e.g., a prescription). In yet another example, a composition can be provided to a subject where the subject self-administers a composition orally, intravenously or by way of an inhaler, for example.

Alternately, one can administer a compound disclosed herein or composition in a local rather than systemic manner, for example, via direct application to the skin, mucous membrane or region of interest for treating, including using a depot or sustained release formulation.

In certain embodiments a pharmaceutical composition comprising a compound disclosed herein is administered alone (e.g., as a single active ingredient (AI or e.g., as a single active pharmaceutical ingredient (API)). In other embodiments, a pharmaceutical composition comprising a compound disclosed herein is administered in combination with one or more additional AIs/APIs, for example, as two separate compositions or as a single composition where the one or more additional AIs/APIs are mixed or formulated together with a compound disclosed herein in a pharmaceutical composition.

Dose and Therapeutically Effective Amount

In some embodiments, an amount of a compound disclosed herein (e.g., in a pharmaceutical composition) is a therapeutically effective amount. In certain embodiments, a pharmaceutical composition comprises a therapeutically effective amount of a compound disclosed herein. In some embodiments, a therapeutically effective amount of a compound disclosed herein is administered to a subject. In some embodiments, a therapeutically effective amount of a compound disclosed herein is an amount needed to obtain an effective therapeutic outcome. In certain embodiments, a therapeutically effective amount of a compound disclosed herein is an amount sufficient to treat or prevent hemorrhage or vascular instability. Determination of a therapeutically effective amount is well within the capability of those skilled in the art, especially in light of the detailed disclosure provided herein.

In certain embodiments, a therapeutically effective amount is an amount high enough to provide an effective therapeutic effect (e.g., a beneficial therapeutic effect) and an amount low enough to minimize unwanted adverse reactions. Accordingly, in certain embodiments, a therapeutically effective amount of a compound disclosed herein may vary from subject to subject, often depending on age, weight, general health condition of a subject and severity of a condition being treated. Thus, in some embodiments, a therapeutically effective amount is determined empirically. Accordingly, a therapeutically effective amount of a compound that is administered to a subject can be determined by one of ordinary skill in the art based on amounts found effective in animal or clinical studies, a physician's experience, and suggested dose ranges or dosing guidelines, for example.

In certain embodiments, a therapeutically effective amount of a compound disclosed herein is administered at a suitable dose (e.g., at a suitable volume, frequency and/or concentration, which often depends on a subject's weight, age and/or condition) intended to obtain an acceptable therapeutic outcome. In certain embodiments, a therapeutically effective amount of a compound comprises one or more doses selected from at least 0.01 mg/kg (e.g., mg of a compound per kg body weight of a subject), at least 0.1 mg/kg, at least 0.5 mg/kg, at least 1 mg/kg, at least 10 mg/kg or at least 100 mg/kg. In certain embodiments, a therapeutically effective amount of a compound is selected from one or more doses of about 0.001 mg/kg (e.g., mg of a compound per kg body weight of a subject) to about 5000 mg/kg, 0.01 mg/kg to 1000 mg/kg, 0.01 mg/kg to 500 mg/kg, 0.1 mg/kg to 1000 mg/kg, 1 mg/kg to 1000 mg/kg, 10 mg/kg to 1000 mg/kg, 100 mg/kg to 1000 mg/kg, 0.1 mg/kg to 500 mg/kg, 0.1 mg/kg to 250 mg/kg, 0.1 mg/kg to 150 mg/kg, 0.1 mg/kg to 100 mg/kg, 0.1 mg/kg to 75 mg/kg, 0.1 mg/kg to 50 mg/kg, 0.1 mg/kg to 25 mg/kg, 0.1 mg/kg to 10 mg/kg, 0.1 mg/kg to 5 mg/kg, 0.5 mg/kg to 5 mg/kg, intervening amounts and combinations thereof. In some aspects a therapeutically effective amount of a compound administered to a subject comprises one or more doses of about 0.1 mg/kg, 0.2 mg/kg, 0.3 mg/kg, 0.4 mg/kg, 0.5 mg/kg, 0.6 mg/kg, 0.7 mg/kg, 0.8 mg/kg, 0.9 mg/kg, 1 mg/kg, 2 mg/kg, 3 mg/kg, 4 mg/kg, 5 mg/kg, 6 mg/kg, 7 mg/kg, 8 mg/kg, 9 mg/kg, 10 mg/kg, 50 mg/kg, 100 mg/kg, 500 mg/kg, and intervening amounts and combinations thereof. In some embodiments a therapeutically effective amount of a compound disclosed herein is between about 0.1 mg/kg and about 50 mg/kg, between about 1 mg/kg and about 50 mg/kg, or between about 1 mg/kg and about 30 mg/kg.

In certain embodiments, a therapeutically effective amount of TPA is administered at a suitable dose (e.g., at a suitable volume, frequency and/or concentration, which often depends on a subject's weight, age and/or condition) intended to obtain an acceptable therapeutic outcome. In some embodiments, TPA is administered at a dose of 0.1 mg/kg to 1.5 mg/kg. As disclosed herein TPA, when administered with a compound disclosed herein, can be administered at higher dose, since compounds disclosed herein can inhibit or mitigate the adverse reactions of TPA. Accordingly, in some embodiments, TPA is administered at a dose of 0.1 mg/kg to 100 mg/kg, at 0.1 mg/kg to 50 mg/kg, 0.1 mg/kg to 30 mg/kg, 0.1 mg/kg to 20 mg/kg, or 0.1 mg/kg to 5 mg/kg. In some embodiments, TPA is administered at a dose of 1.0 mg/kg to 100 mg/kg, at 1.0 mg/kg to 50 mg/kg, 1.0 mg mg/kg to 30 mg/kg, 1.0 mg/kg to 20 mg/kg, or 1.0 mg mg/kg to 5 mg/kg. In some embodiments, TPA is administered at a dose of 1.5 mg/kg to 100 mg/kg, 1.5 mg/kg to 50 mg/kg, 1.5 mg mg/kg to 30 mg/kg, 1.5 mg/kg to 20 mg/kg, or 1.5 mg mg/kg to 5 mg/kg. In some embodiments, TPA is administered at a dose of about 1.6 mg/kg to 100 mg/kg, 1.8 mg/kg to 100 mg/kg, 2.0 mg/kg to 100 mg/kg, 1.6 mg/kg to 50 mg/kg, 1.8 mg/kg to 50 mg/kg, 2.0 mg/kg to 500 mg/kg, 1.6 mg/kg to 30 mg/kg, 1.8 mg/kg to 30 mg/kg, 2.0 mg/kg to 30 mg/kg, 1.6 mg/kg to 20 mg/kg, 1.8 mg/kg to 20 mg/kg, 2.0 mg/kg to 20 mg/kg, 1.6 mg/kg to 5 mg/kg, 1.8 mg/kg to 5 mg/kg, or 2.0 mg/kg to 5 mg/kg. In some embodiments, TPA is administered in combination with a compound disclosed herein. In some embodiments, TPA is administered substantially at the same time as, or before administration of a compound disclosed herein. Substantially at the same time means that TPA and a compound disclosed herein are administered within a time period of 30 minutes. In some embodiments, TPA is administered after administration of a compound disclosed herein. In certain embodiments, a dose of TPA can be administered with a compound disclosed herein at a dose that is greater than 20 mg, greater than 30 mg, greater than 40 mg, greater than 50 mg, greater than 90 mg, greater than 100 mg or greater than 110 mg when administered as a bolus dose, or by infusion over a period of 30 minutes to 10 hours, or 30 minutes to 2 hours.

In some embodiments administering a therapeutically effective amount of a compound disclosed herein, or a pharmaceutical composition comprising a compound disclosed herein, comprises administering a suitable dose at a frequency or interval as needed to obtain an effective therapeutic outcome. In some embodiments administering a therapeutically effective amount of a compound or a pharmaceutical composition disclosed herein comprises administering a suitable dose hourly, every two hours, every 4 hours, every 6 hours, three times a day, twice a day, once a day, six times a week, five times a week, four times a week, three times a week, twice a week, weekly, at combinations thereof, and/or at regular or irregular intervals thereof, and/or simply at a frequency or interval as needed or recommended by a medical professional. In some embodiments, a therapeutically effective amount of a compound or pharmaceutical composition is administered continuously by, for example by intravenous administration.

In some embodiments a therapeutically effective amount of a compound is administered to a subject prior to, during and/or after a subject receives a thrombolytic, anti-coagulant or endovascular intervention therapy. In some embodiments a therapeutically effective amount of a compound is administered to a subject up to 3 days prior to, up to 2 days prior to, up to 1 day prior to, up to 20 hours prior to, up to 15 hours prior to, up to 10 hours prior to, up to 5 hours prior to, up to 2 hours prior to or up to 1 hour prior to administration of a thrombolytic, anti-coagulant or endovascular intervention therapy. In some embodiments a therapeutically effective amount of a compound is administered to a subject 0 to 72 hours, 0 and 48 hours, 0 to 24 hours, 0 to 12 hours, 0 to 6 hours, 0 to 4 hours, or 0 to 2 hours before administration of a thrombolytic, anti-coagulant or endovascular intervention therapy. In some embodiments a therapeutically effective amount of a compound is administered during, or concurrently with, administration of a thrombolytic, anti-coagulant or endovascular intervention therapy. In some embodiments a therapeutically effective amount of a compound is administered intermittently or continuously for up to 1 hour after, 2 hours after, 4 hours after, 6 hours after, 12 hours after, 24 hours after, 2 days after, 3 days after, a week after, 1 month after, 3 months after, 6 months after, 12 months after, 18 months after, 24 months after or up to 36 months administration of a thrombolytic, anti-coagulant or endovascular intervention therapy.

In some embodiments, a therapeutically effective amount of a compound described herein is administered 1 hour to 1 week after administration of the thrombolytic therapy, or intervening ranges thereof. In certain embodiments, a therapeutically effective amount of a compound described herein is administered 1 to 48 hours, 2 to 48 hours or 4 to 48 hours, after administration of the thrombolytic therapy.

In some embodiments a thrombolytic therapy comprises administration of tissue plasminogen activator (TPA). TPA is often administered within a time period of 30 seconds to 3.5 hours after a subject experiences an ischemic stroke. However, TPA administration can cause adverse and sometimes lethal side effects such as hemorrhage, vascular instability and disruption of the blood brain barrier. As disclosed herein, administration of a compound described herein can prevent, reduce the risk of, inhibit the severity of, reduce, mitigate and/or treat hemorrhage associated with TPA administration. Accordingly, in some embodiments, a therapeutically effective amount of a compound described herein is administered concurrently with, within 0 to 48 hours after, or up to 1-3 weeks after TPA administration. In some embodiments, a therapeutically effective amount of a compound described herein is administered 1 to 24 hours, 2 to 24 hours, 3 to 24 hours, 3.5 to 24 hours, or 4 to 24 hours after TPA administration. In some embodiments, a therapeutically effective amount of a compound described herein is administered 0 to 8 hours, 0 to 6 hours or 0 to 4 hours after TPA administration.

In certain embodiments, administration of a compound described herein can widen the window of effective and safe TPA administration after stroke. For example, the benefits of TPA administration are often considered to outweigh the risks of hemorrhage only if administered to a subject within 30 seconds to 3 hours after a stroke. In certain embodiments, administration of a compound described herein before, concurrently with, or after TPA administration not only extends the treatment window of TPA but also greatly expands the patient population that can be treated safely with TPA.

Kits

In some embodiments, provided herein is a kit comprising a compound disclosed herein or a pharmaceutical composition comprising a compound disclosed herein. In some embodiments, a kit comprises one or more doses of a pharmaceutical composition comprising a compound disclosed herein. In some embodiments, a kit comprises one or more packs and/or one or more dispensing devices, which can contain one or more doses of a compound disclosed herein, or pharmaceutical composition thereof, as described herein. Non-limiting examples of a pack include a metal, glass, or plastic container, syringe or blister pack that comprises a compound disclosed herein or a composition described herein. In certain embodiments, a kit comprises a dispensing device such as a syringe or inhaler, that may or may not comprise a compound disclosed herein or a composition described herein. A pack and/or dispenser device can be accompanied by instructions for administration. The pack or dispenser can also be accompanied with a notice associated with the container in a form prescribed by a governmental agency regulating the manufacture, use, or sale of pharmaceuticals, which notice is reflective of approval by the agency of the form of the drug for human or veterinary administration. Such notice, for example, can be the labeling approved by the U.S. Food and Drug Administration for prescription drugs, or the approved product insert.

In some embodiments a kit or pack comprises an amount of a compound disclosed herein sufficient to treat a patient for 1 day to 1 year, 1 day to 180 days, 1 day to 120 days, 1 day to 90 days, 1 day to 60 days, 1 day to 30 days, 1-24 hours, 1-12 hours, 1-4 hours, or amount of time there between.

A kit optionally includes a product label and/or one or more packaging inserts, that provide a description of the components or instructions for use in vitro, in vivo, or ex vivo, of the components therein. Exemplary instructions may include instructions for a treatment protocol or therapeutic regimen. In certain embodiments, a kit comprises packaging material, which refers to a physical structure housing components of the kit. The packaging material can maintain the components sterilely and can be made of material commonly used for such purposes (e.g., paper, corrugated fiber, glass, plastic, foil, ampules, vials, tubes, etc.). Product labels or inserts include "printed matter," e.g., paper or cardboard, or separate or affixed to a component, a kit or packing material (e.g., a box), or attached to an ampule, tube or vial containing a kit component. Labels or inserts can additionally include a computer readable medium, optical disk such as CD- or DVD-ROM/RAM, DVD, MP3, magnetic tape, or an electrical storage media such as RAM and ROM or hybrids of these such as magnetic/optical storage media, FLASH media or memory-type cards. Product labels or inserts can include identifying information of one or more components therein, dose amounts, clinical pharmacology of the active ingredient(s) including mechanism of action, pharmacokinetics (PK) and pharmacodynamics (PD). Product labels or inserts can include information identifying manufacturer information, lot numbers, manufacturer location, date, information on an indicated condition, disorder, disease or symptom for which a kit component may be used. Product labels or inserts can include instructions for the clinician or for a subject for using one or more of the kit components in a method, treatment protocol or therapeutic regimen. Instructions can include dosage amounts, frequency or duration, and instructions for practicing any of the methods, treatment protocols or therapeutic regimes set forth herein. A kit can additionally include labels or instructions for practicing any of the methods described herein. Product labels or inserts can include information on potential adverse side effects and/or warnings.

EXAMPLES

Example 1—Suture Transient MCAO Model

A suture-type transient middle cerebral artery occlusion (MCAO) model was used to determine the efficacy and dose response of J147 (Compound IV) on reperfusion using male Sprague Dawley rats having a body weight in a range of 280-320 g. In this model, J147 was administered i.v. at doses of 1 mg/kg, 10 mg/kg and 30 mg/kg of total body weight immediately after reperfusion (i.e., about 2 hours after ischemia onset). A dose of 10 mg/kg (iv) was considered as an optimal effective dose in this study.

Suture transient MCAO model
SD rat: 280 to 320 g
Stroke mode: suture, Ischemia for 2 hours followed by Reperfusion for 24 hours
Bederson scale* (tested at 24 hours after reperfusion): 0 to 5, less to more behavioral neurological deficits
J147: administered immediately after reperfusion
J147 stocking solution: 6 mg/ml, 30% HS15/70% saline
J147 working solution: stock solution/saline 1:1 (3 mg/ml, 15% HS15/85% saline)
Vehicle: 15% HS15/85% saline
  iv injection (bolus): 3.3 ml/kg body weight.
  ip injection (bolus): 10 ml/kg body weight
Rat: Maximum volume (iv., bolus)=5 ml/kg. (ip., bolus)=10 ml/kg.

Following stroke, animals exhibit a variety of neurological deficits. The Bederson scale is a global neurological assessment that was developed to measure neurological impairments following stroke. Tests include forelimb flexion, resistance to lateral push and circling behavior. In this case, a Bederson grading scale of 0-5 was used to assess behavioral deficits after reperfusion. This scoring scale is a simple way to reveal basic neurological deficits. Ischemic animals will have significantly more neurological deficits than non-ischemic animals, resulting in a higher score.

Results are shown in FIG. 1. Representative images (chosen from the median animals of each group) of triphenyl tetrazolium chloride (TTC)-stained brain coronal sections A-H showing tissue infarction (white color) in the indicated groups 24 hours after reperfusion. Panels A&B are control animals treated with placebo and showing Bederson Scores 3 and 5, and significant infarct volume (white) after reperfusion. Panels C&D are animals treated with 1 mg/kg J147 administered intravascularly (iv), showing better Bederson Scores of 3 and 3, and insignificant reduction in infarct volume relative to placebo. Panels E&F are animals treated with 10 mg/kg J147 administered iv, showing much improved Bederson scores of 1 and 2, and a large reduction of infarct volume after reperfusion. Panels G&H are animals treated with J147 administered intraperitoneally, showing Bederson scores of 2 and 3, and modest reduction of infarct volume after reperfusion.

Example 2—Embolic MCAO Model

For embolic MCAO model (eMCAO), a single 4 μm fibrin rich clot was placed in the origin of the right MCA via a modified PE-50 tube (0.3-mm outer diameter). Regional cerebral blood flow (rCBF) in the MCA territory (2 mm posterior and 5 mm lateral to the bragma on the right parietal skull) was monitored with Laser doppler flowmetry (MSP300XP; ADInstruments Inc). The animals' rCBF reduction to 25% or less of baseline level was included in the study.

Figure 2:
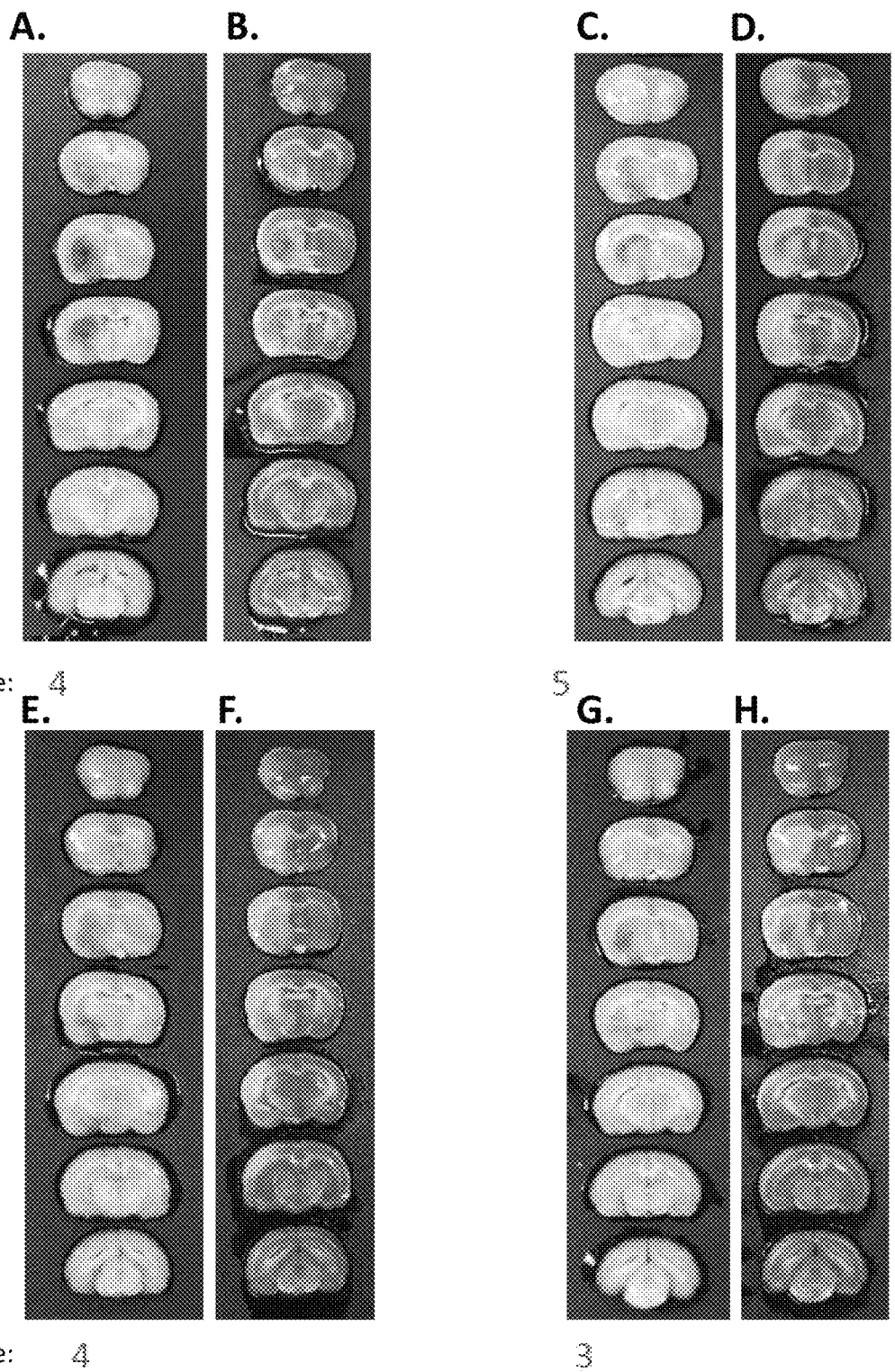
FIGS. 2A-2H show images of brains isolated from animals treated with tPA only and FIGS. 3A-3H show images of brains isolated from animals treated with tPA+J147. Representative images of unstained coronal sections (FIG. 2A, 2C, 2E, 2G & FIGS. 3A, 3C, 3E and 3G) show intracerebral hemorrhage (red color) and TTC-stained coronal sections (FIG. 2B, 2D, 2F, 2H & FIGS. 3B, 3D, 3F and 3H) show tissue infarction (white color) and normal tissue (red color) in the indicated groups 24 hours after stroke.
Figure 3:
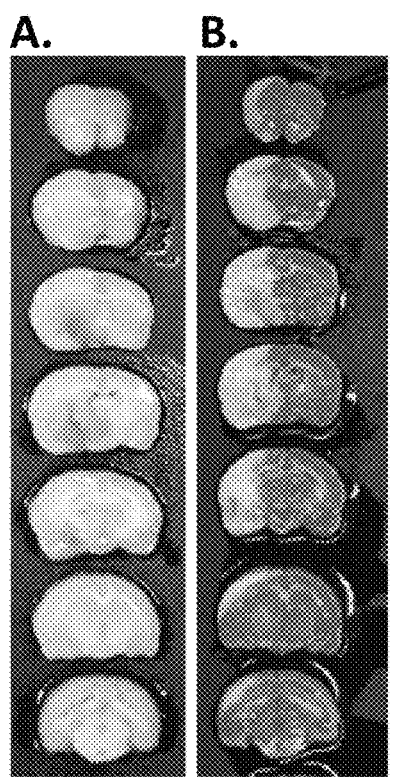
Figure 3:
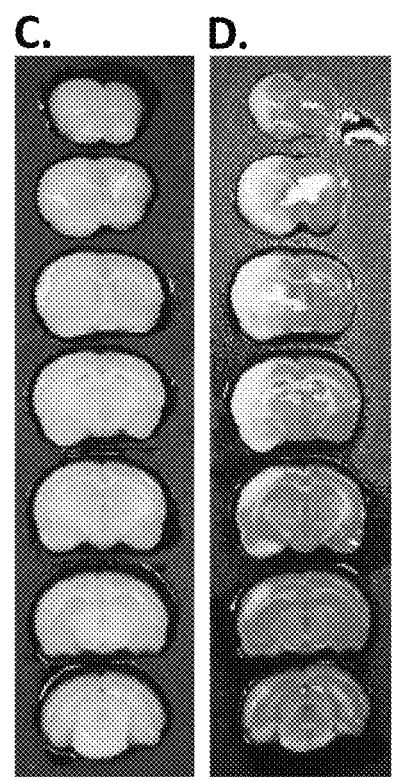
Figure 3:
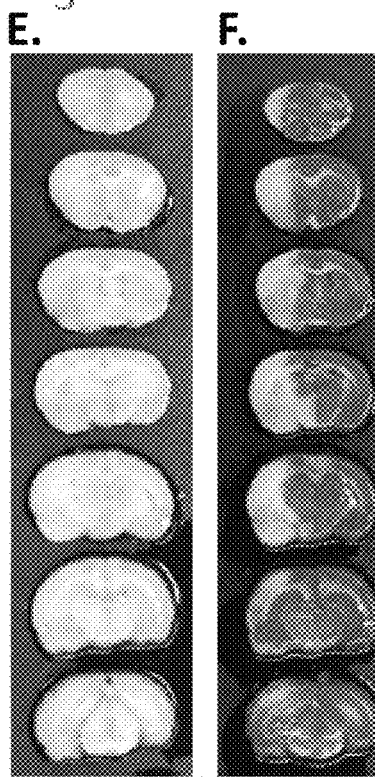
Figure 3:
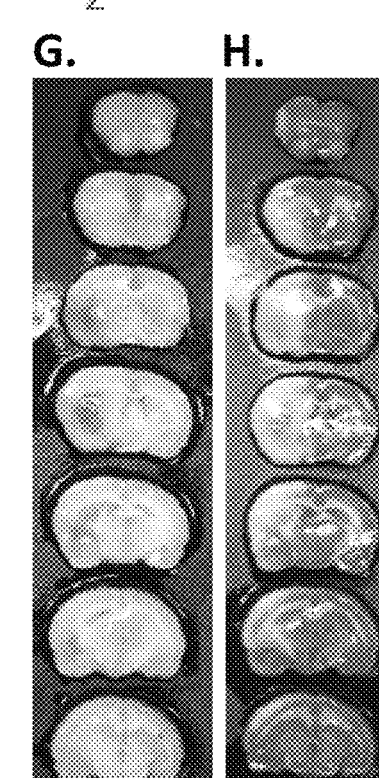
Figure 4A:
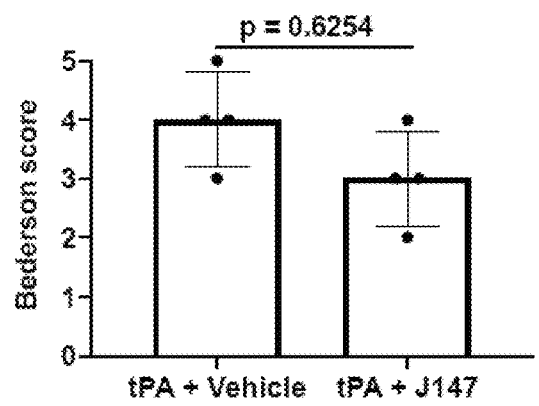
FIG. 4A shows a graph of Bederson scores showing a positive trend in tPA+J147-treated vs tPA-only treated animals (p=0.6254).
Figure 4B:
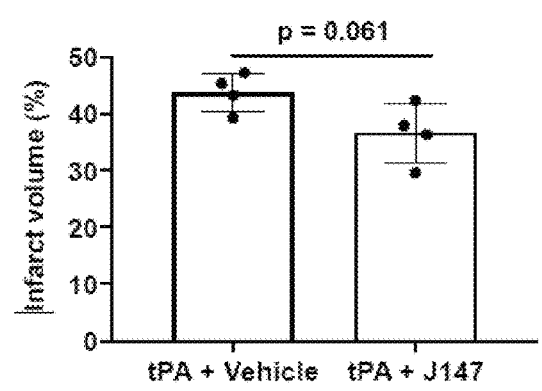
FIG. 4B shows a graph of scan-quantified infarct volume showing a positive trend in tPA+J147-treated animals (p=0.061).
Figure 4C:
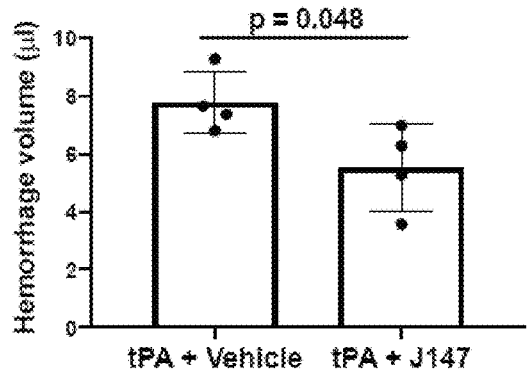
FIG. 4C shows a graph of quantified hemorrhage volume showing a significant improvement in tPA+J147-treated animals (p=0.048).

Combined treatment: J147+tPA, tissue plasminogen activator, the only drug approved by the FDA for the treatment of stroke.
SD rat: 280 to 320 g
Stroke mode: eMCAO, 4 μm blood clot
Bederson scale (tested at 24 hour after ischemia): 0 to 5
J147 (10 mg/kg: 5% DMSO, 70% PEG200 and 25% Saline): at 4 h after ischemia onset (iv infusion for 1 min)
tPA (10 mg/kg (2 mg/ml)): at 4 hour after ischemia onset 10% bolus for 1 min., 90% infused for 30 min.
Two groups: tPA-only treated and tPA+J147-treated Results are shown in FIG. 2 (animals treated with tPA only) and FIG. 3 (Animals treated with tPA+J147). Representative images are shown (chosen from the median animals of each group) of unstained coronal sections (A, C, E, G) showing intracerebral hemorrhage (red color) and TTC-stained coronal sections (B, D, F, H) showing tissue infarction (white color) in the indicated groups 24 hours after stroke. FIG. 4A shows a graphical plot of Bederson scores showing positive trend in tPA+J147-treated vs tPA-only treated animals (p=0.6254). FIG. 4B shows a graphical plot of scan-quantified infarct volume showing positive trend in tPA+J147-treated animals (p=0.061). FIG. 4C shows a graphical plot of quantified hemorrhage volume showing a significant improvement in tPA+J147-treated animals (p=0.048).

Example 3—J147 Dose-Response (Expanded Study)

Objective: This experiment was performed to determine dose-dependent therapeutic effects of J147, and to identify an optimal dose.

J147 stock solution: 6 mg/ml in 30% HS15/70% saline

J147 working solution: 3 mg/ml in 15% HS15/85% saline (stock solution/saline 1:1)

Vehicle: 15% HS15/85% saline

Male SD rats; n=7-8 per group

Figure 5A:
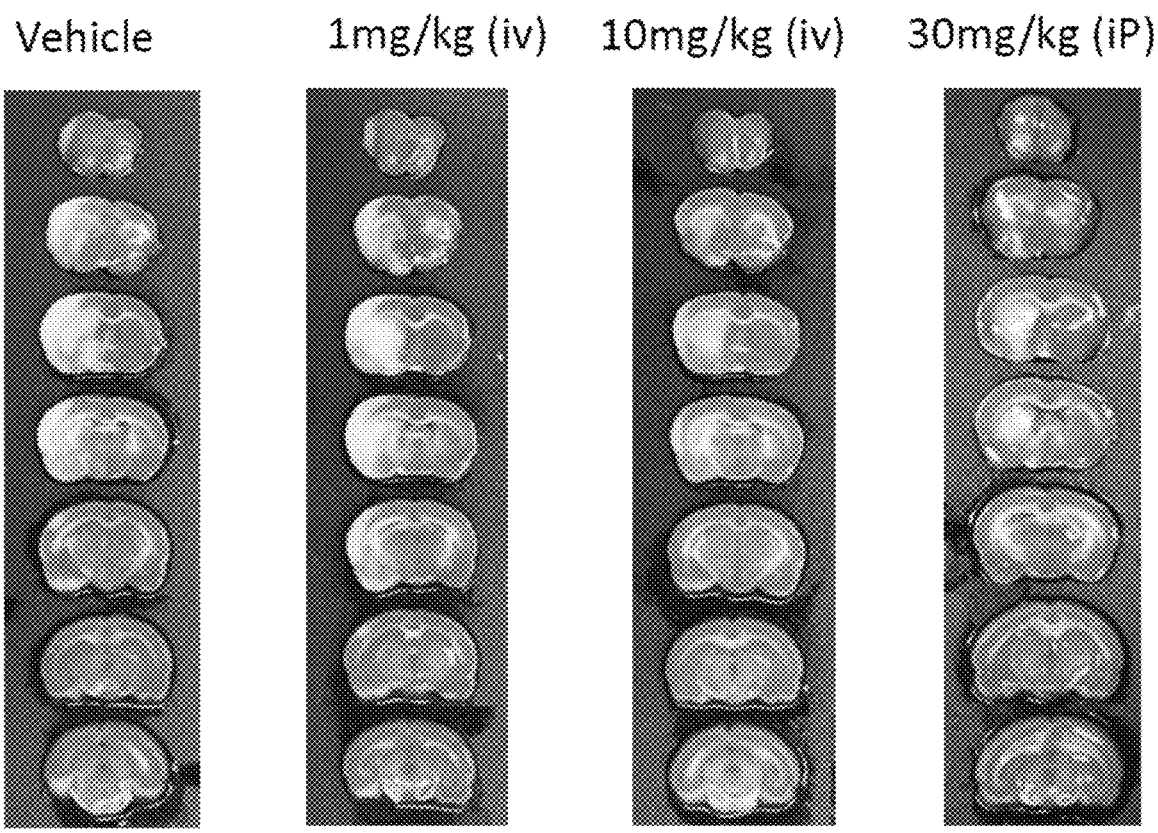
FIG. 5A shows TTC-stained coronal sections of brain isolated from rats treated with vehicle or J147. Red color indicates normal tissue and white color indicates tissue infarction (white color) in the indicated groups. Rats were subjected to 2-hour ischemia followed by reperfusion. Infarct volume (FIG. 5C) and Bederson scores (FIG. 5B) were assessed 72 hours after stroke. (n=7-8 per group). The * symbol indicates P<0.05.
Figure 5B:
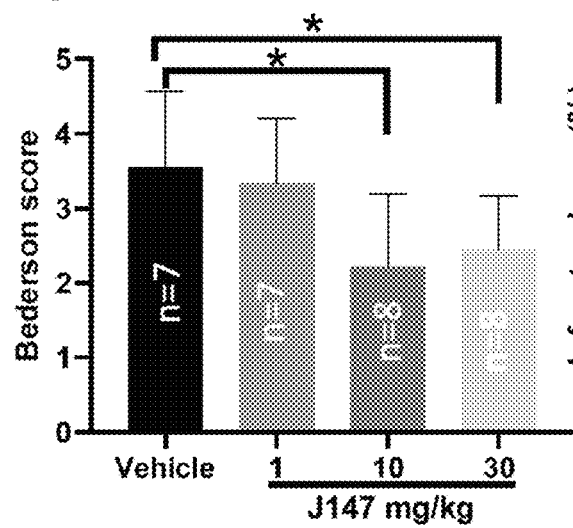
Figure 5C:
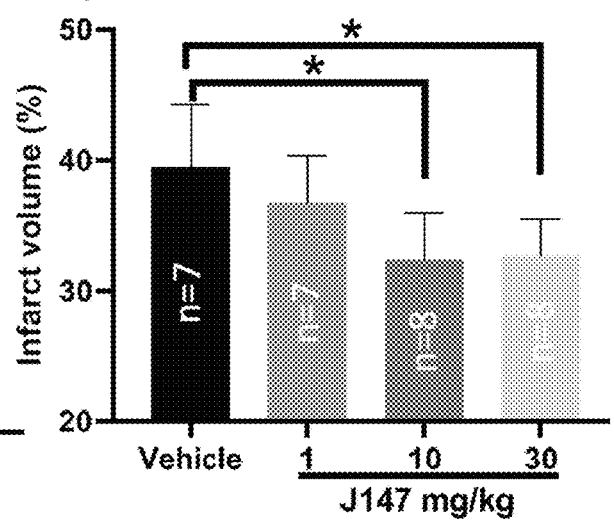
Figure 6A:
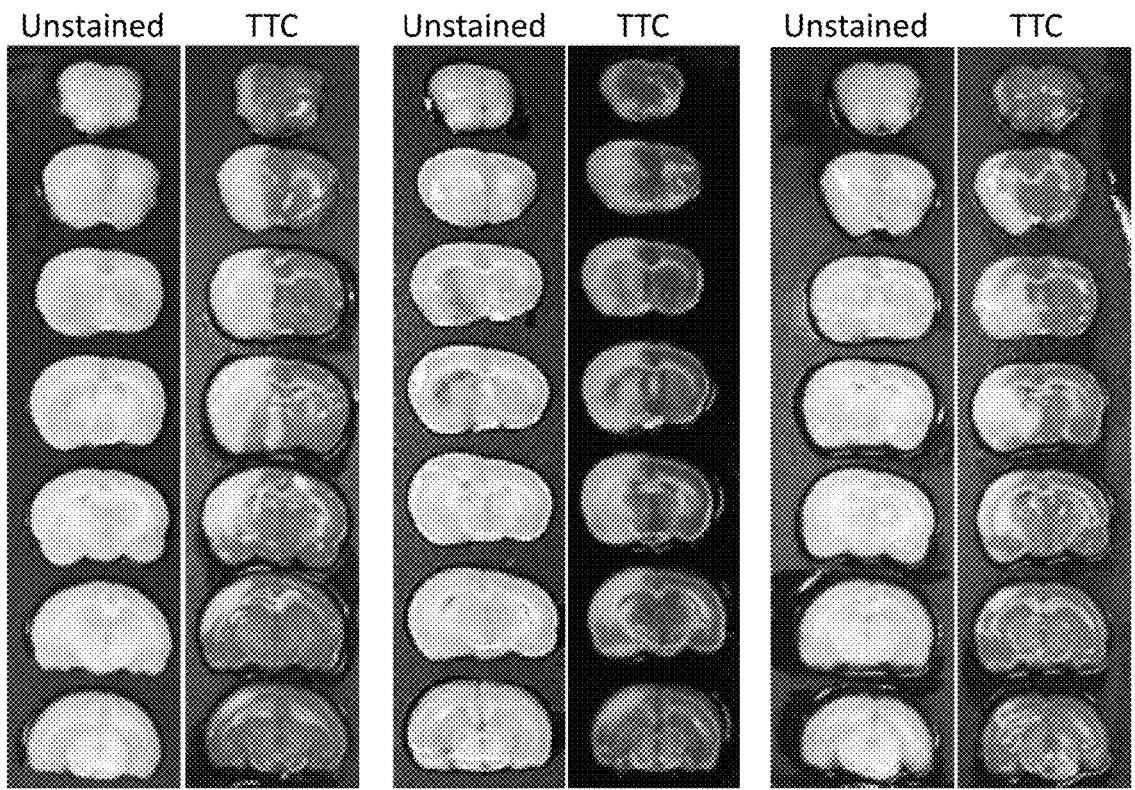
FIG. 6A shows unstained and TTC-stained coronal sections of brain isolated from rats treated with saline, tPA+vehicle or tPA+J147. Red color in TTC stained sections indicates normal tissue and white color indicates tissue infarction in the indicated groups. Rats were subjected to 2-hour ischemia followed by reperfusion. Infarct volume (FIG. 6C), Bederson scores (FIG. 6B) and blood volume (FIG. 6D) were assessed 72 hours after stroke. (n=7-8 per group). The * symbol indicates P<0.05.
Figure 6B:
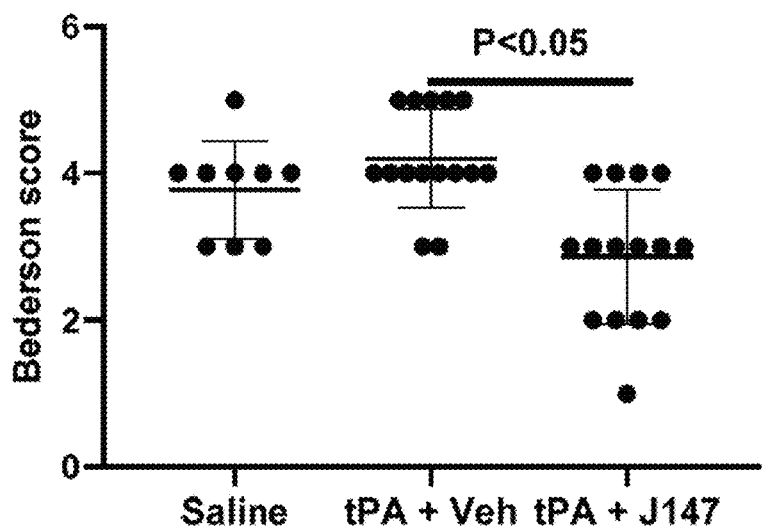
Figure 6C:
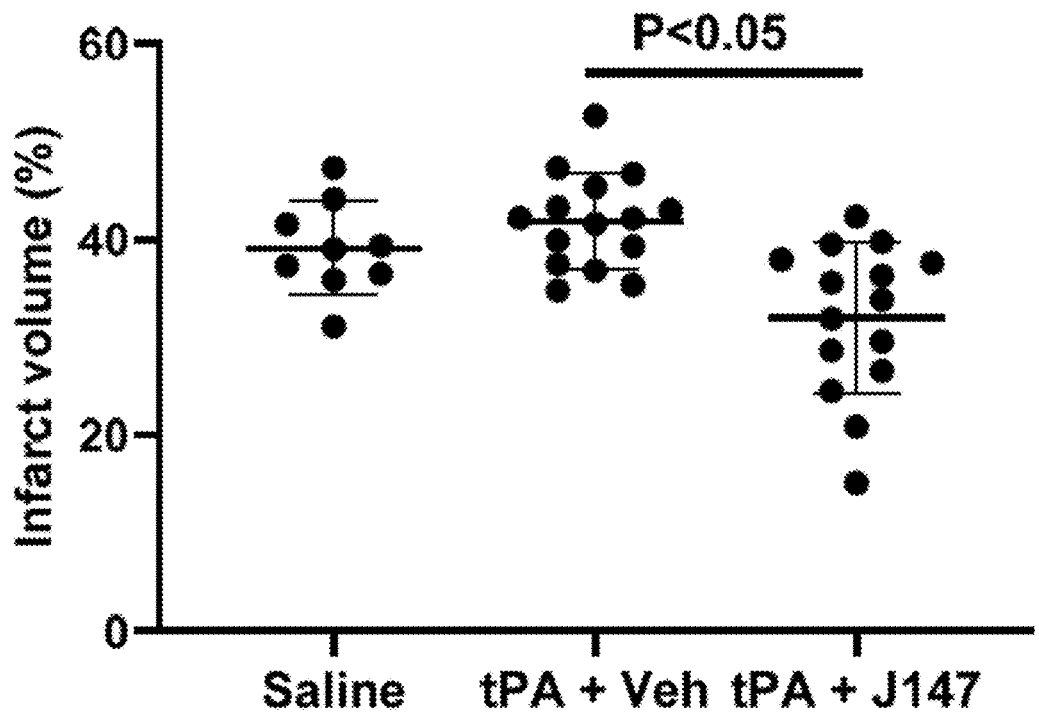
Figure 6D:
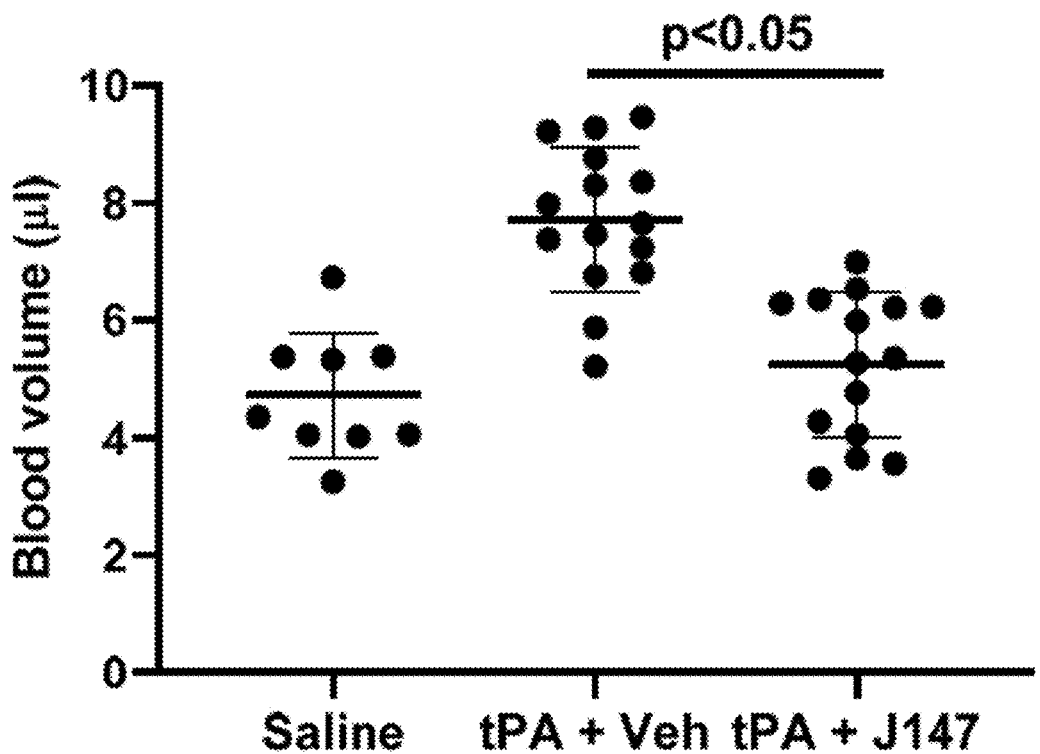

Methods: Male SD rats (280-300 g) were subjected to a 2-hour suture MCAO-induced ischemia followed by reperfusion. J147 compound (1.0, 10, 30 mg/kg) and vehicle were administered at 2 hours after onset of ischemia (FIG. 5). Bederson score was examined prior to the sacrifice at 72 h after stroke. Infarct volumes in TTC-stained brain coronal sections were measured. Results: J147 treatment significantly reduced infarct volumes and neurological deficit after reperfusion in a dose-dependent manner. A dose of 10 mg/kg J147 is selected as an "effective optimal dose" for the treatment of acute ischemic stroke in rats.

Example 4—J147+tPA Expanded Study (~80 Animals)

Objective: To determine whether J147 can prevent tPA-associated brain hemorrhage and extend the treatment time window of tPA in a clinically relevant thromboembolic stroke model in rats.

J147 compound: Stock solution: 60 mg/ml DMSO, in 60 ul/vial, stored at −20° C.

Working solution: 3 mg/ml in 5% DMSO, 70% PEG200 and 25% normal saline, prepared prior to injection.

One vial stock solution was warmed at 37° C. and mixed with 1140 ul sterilized solution (PEG200: saline, 2.8:1).

Recombinant human tPA (Alteplase, 2.2 mg/vial): Reconstituted with 1.1 ml water (2 mg/ml). 10 mg/kg, 10% bonus injection, 90%30 min. via mini pump.

A. Infarct Volume and Intracerebral Hemorrhage

Methods: Male SD rats (280-300 g) were subjected to thromboembolic middle cerebral artery occlusion (MCAO) and treated with saline at 4 hours, tPA (tissue-type plasminogen activator; 10 mg/kg, IV) at 4 hours, and combined J147 (10 mg/kg, IV) plus tPA at 4 hours after onset of ischemia. Bederson score was examined prior to the sacrifice at 72 h after stroke. Infarct volumes, brain hemorrhage, and animal mortality were measured.

Results: tPA treatment at 4 hours alone did not decrease brain infarction but instead worsened hemorrhagic transformation. Combining J147 with tPA reduced infarct volume and ameliorated brain hemorrhage (FIG. 6A-6D). The mortality rate in saline and tPA alone treatment groups were 25% (3 of 12 rats) and 32% (7 of 22 rats), respectively. The mortality rate was reduced to 12% in combination treatment group (TABLE 1).

Conclusion: J147 plus tPA combination treatment attenuates tPA-associated hemorrhage and alleviates brain damage after eMCAO. Consequently, the use of J147 in combination with tPA may extend the length of the therapeutic window for administration of tPA following an ischemic event and thereby increase the number of stroke patients that could benefit from use of tPA.

TABLE 1

| | Mortality Rates | | |
|---|---|---|---|
| Group | Saline at 4 h n = 12 | tPA at 4 h n = 22 | J147 plus tPA at 4 h n = 17 |
| Death (mortality rate) | 3 (25%) | 7 (32%) | 2 (12%)* | log-rank test
*p < 0.05 vs Saline or IPA alone group

B. Immunohistochemistry

Figure 7:
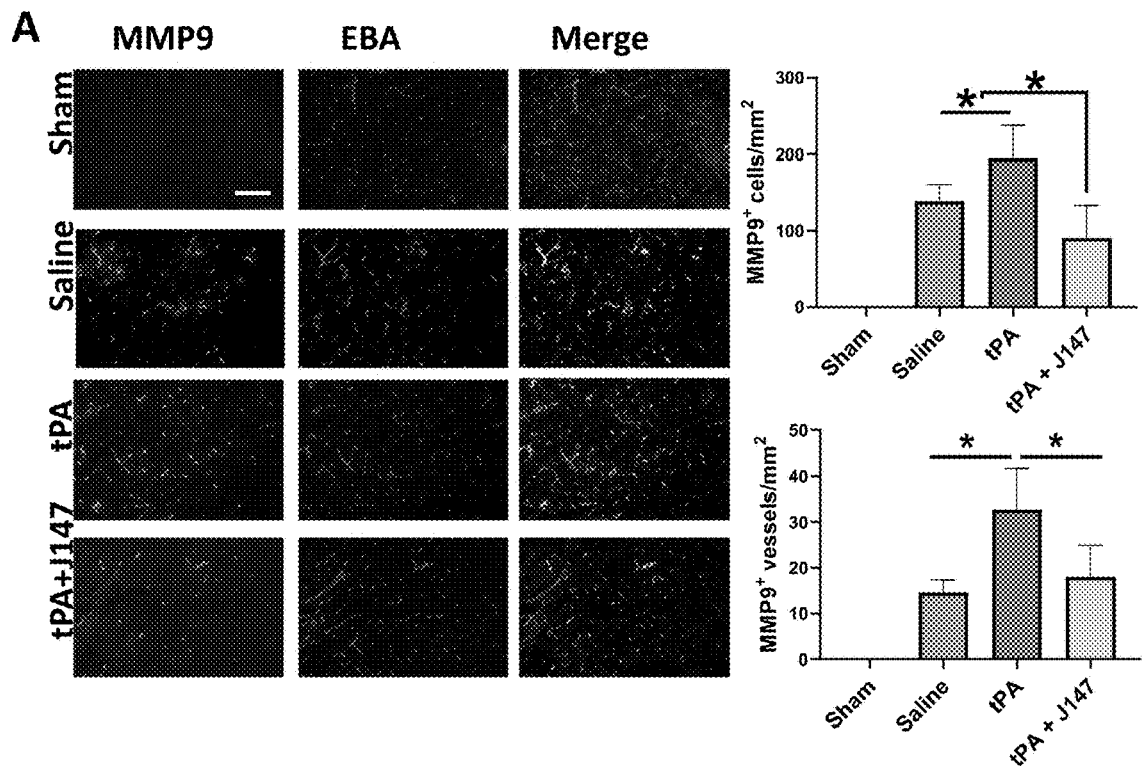
FIG. 7A shows representative images of double immunofluorescence staining for MMP-9 with the endothelial barrier antigen (EBA) in the indicated groups. Quantitative analysis showing the combination treatment (tPA and J147) significantly inhibits MMP9 expression in both individual cells and microvessels compared to vehicle or tPA alone groups. Bar=100 um, *P<0.05. n=3 animals per group.
FIGS. 7B and 7C show representative images (top) and quantitative analysis (bottom) of brain neutrophil infiltration (A) and microglia expansion (B) in the indicated groups. Bar=100 um, *P<0.05. n=3 animals per group.
Figure 7:
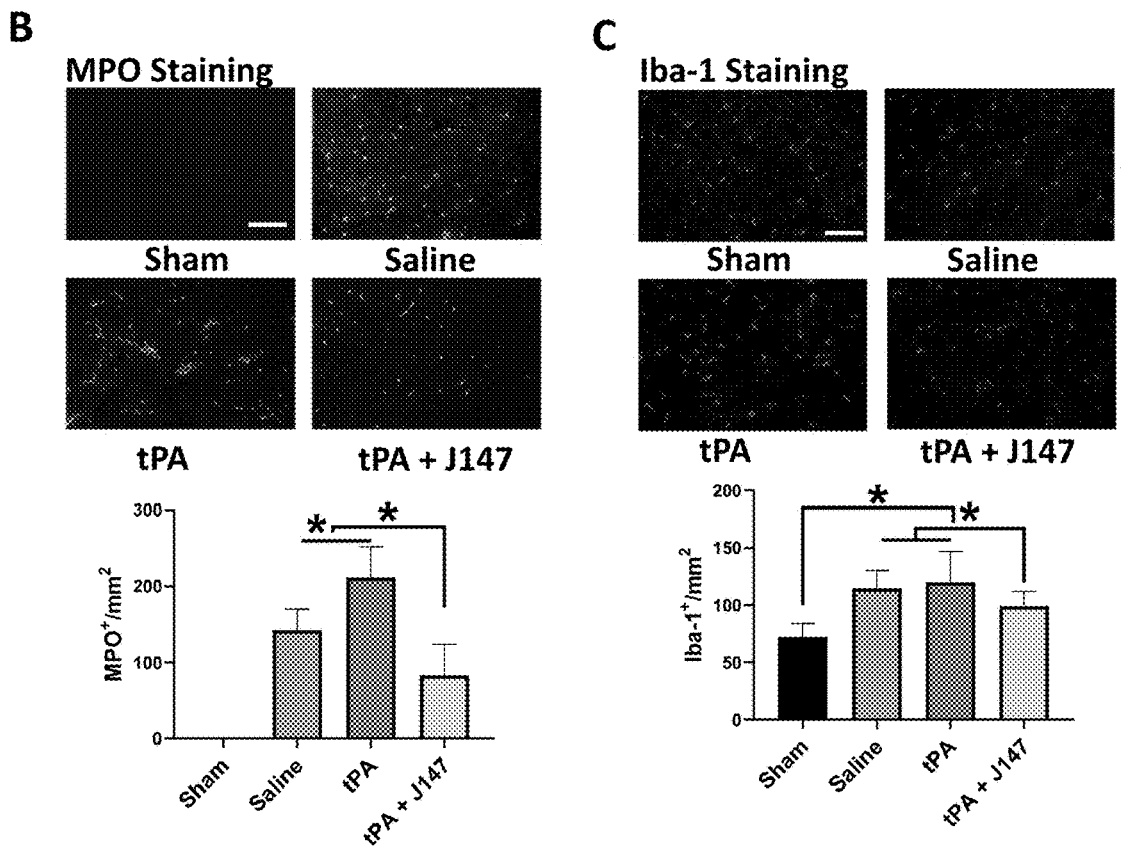

MMPs, in particular MMP-9, play a critical role in the stroke-associated blood-brain barrier (BBB) disruption, hemorrhagic transformation and neuroinflammation after stroke. Double immunohistochemistry was performed to determine MMP-9 expression in the brain at 24 hours after stroke (FIG. 7A).

Methods: At the indicated time point, animals were euthanized with CO2 and transcardially perfused with 200 mL ice-cold PBS (0.01 M, pH 7.4) followed by 4% paraformaldehyde (PFA). The brains were removed and post-fixed in 4% PFA solution for overnight at 4° C. Brain samples were then cryoprotected by immersion in 10%, 20%, and 30% gradient sucrose solutions for 48 h at 4° C. respectively. After that, the brains were embedded in optimal cutting temperature (OCT) compound. Coronal sections (15 um) were cut at 0.4 to 1.4 mm posterior to bragma using a cryostat and mounted on positively charged slides. Every twentieth coronal section for a total five sections was used for immunohistochemistry. The primary antibodies: IBa-1 (1:200, Wako), MPO (1:200, Abcam), MMP9 (1:100, R&D), EBA (endothelial barrier antigen, a marker for endothelium in the vessels, 1:500, Covance), fibrinogen (1:200, Dako), thrombocyte (1:200, lifespan) and PAI-1 (1:200, Novus Biologicals) were used. Isotype matched antibodies were used as negative controls. Immunostaining was performed by conventional methods.

For quantification, the number of immunoreactive vessels were counted in the ischemic boundary zone. All immunostaining data was analyzed by an investigator blinded to experimental groups using Image Pro plus software (version 5.1, Media Cybernetics, Inc.) and data are presented as the density of immunoreactive vessels relative to the imaged area (mm2) as described. Data were expressed as mean±standard error of the mean (SEM). GraphPad Prism 8 software package was used for statistical analysis. Unless otherwise indicated, multiple comparisons were made using a 1-way analysis of variance (ANOVA) followed by the Bonferroni post hoc test. If only two groups were compared, unpaired, 2-tailed Student t test was applied. p<0.05 was considered statistically significant.

Results: MMP-9 immunoreactivity was absent in the sham-operated rats and markedly increased in stroke animals. In delayed tPA treatment group, it was further increased, which was present on both the individual cells and brain microvessels (marked by endothelial barrier antigen staining). However, combination treatment with J147 markedly decreased the MMP9 expression on both individual cells and microvessels. We also evaluated the neutrophil (MPO) infiltration and microglia (Iba-1) expansion in the brain, both of which are involved in the postischemic neuroinflammation. Immunostaining showed that MPO positive cells were not detected in the sham-operated rats, but significantly induced by stroke and further augmented by delayed tPA treatment (FIG. 7B). The combination treatment with J147 markedly reduced neutrophil infiltration into the brain parenchyma poststroke. Furthermore, the number of the Iba-1-positive cells was significantly increased after stroke (FIG. 7C). However, the combination treatment with J147 significantly blocked the microglia expansion; in contrast, delayed tPA alone showed no significant effect on the expansion of microglia with saline alone group. The shape of most Iba-1 positive cells was transformed from a highly ramified into a less ramified or amoeboid cell shape in saline and tPA alone group, indicating that microglia has been activated. Importantly, it was significantly inhibited by combination treatment with J147.

Conclusion: J147 treatment alleviates ischemia-induced and delayed tPA-enhanced neuroinflammation.

Figure 8:
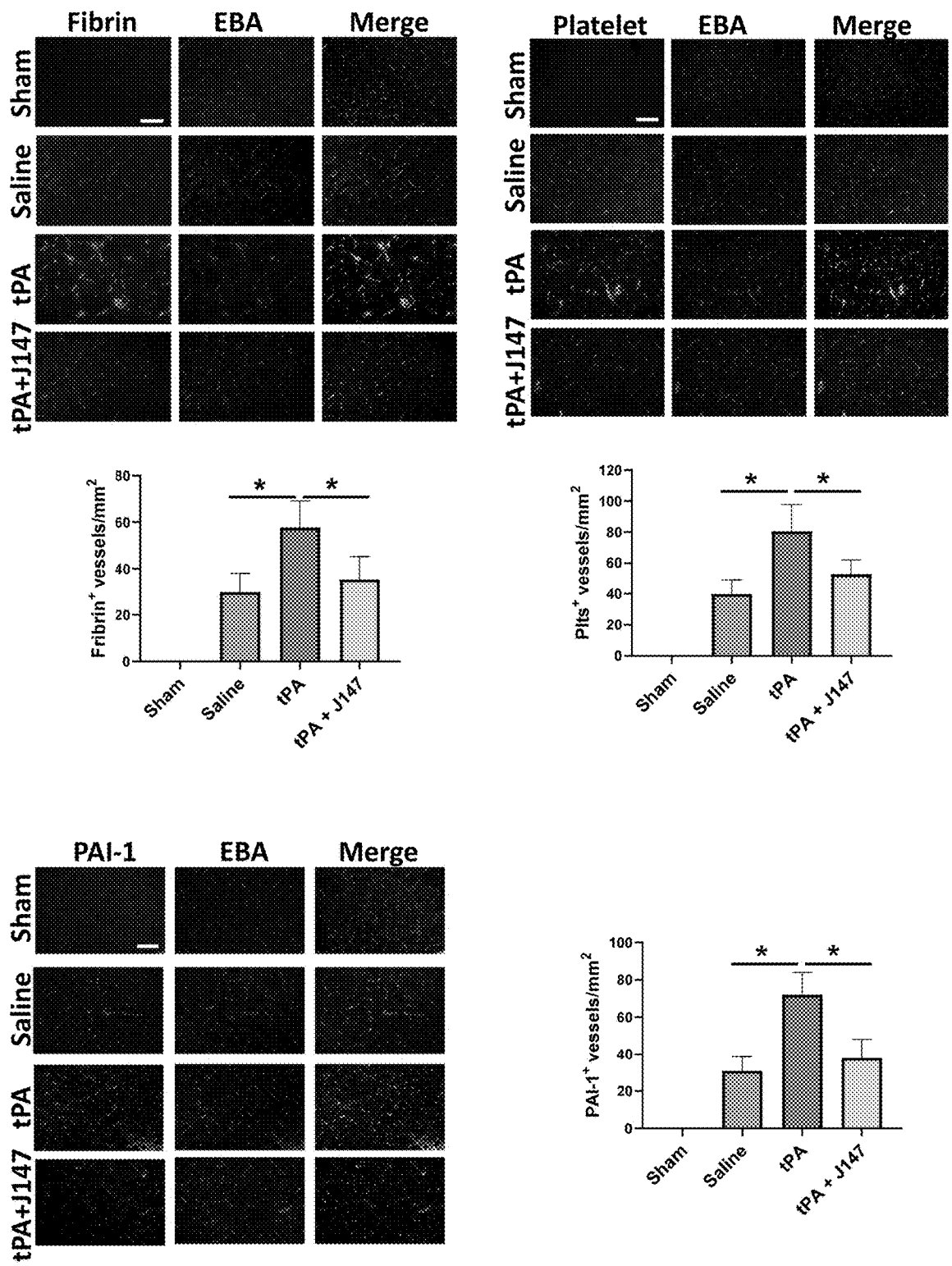
FIGS. 8A and 8B shows representative images of double immunofluorescence staining showing fibrin (A, top) or thrombocyte (B, top) deposited in brain microvessels (marked by endothelial barrier antigen [EBA] staining). The number of fibrin-positive (A, bottom) and thrombocyte-positive (B, bottom) vessels was counted as described in the Methods.
FIG. 8C shows representative images of double immunofluorescence staining for PAI-1 (green) with EBA (red) in indicated groups. The number of PAI-1-positive vessels was counted as described in the Methods. Bar=100 um, *P<0.05. n=3 animals per group.

Intravascular fibrin/fibrinogen deposition and platelet accumulation substantially contribute to secondary microvascular thrombosis after ischemic stroke. Double immunofluorescence staining showed that intravascular fibrin/fibrinogen deposition (FIG. 8A) and platelet accumulation (FIG. 8B) were rarely detected in sham-operated rats and at a relatively low level detected in the saline-treated stroke animals, possibly because of low cerebral perfusion in downstream microvessels without tPA thrombolysis in this embolic stroke mode. However, both the fibrin/fibrinogen and platelets deposited in downstream microvessels were markedly increased in stroke rats with delayed tPA, and these increases were significantly attenuated by combination treatment with J147 (FIGS. 8A and 8B).

Results: Evidence shows that local upregulation of PAI-1 (plasminogen activator inhibitor-1), a downstream mediator in the NF-κB cascade, in ischemic brain endothelium contributes to intravascular fibrin/fibrinogen deposition during ischemia/reperfusion-induced acute brain ischemic injury. Double immunohistochemistry showed that combination treatment with J147 significantly reduced ischemia-induced and delayed tPA-enhanced PAI-1 expression in brain endothelial cells observed in the peri-ischemic area of the cerebral cortex (FIG. 8C).

Conclusion: J147 treatment alleviates delayed tPA-enhanced microvascular thrombosis and thereby extends the duration of the therapeutic window when tPA may be administered after an ischemic event.

C. Platelet Activation and Platelet-Leukocyte Interactions

Figure 9:
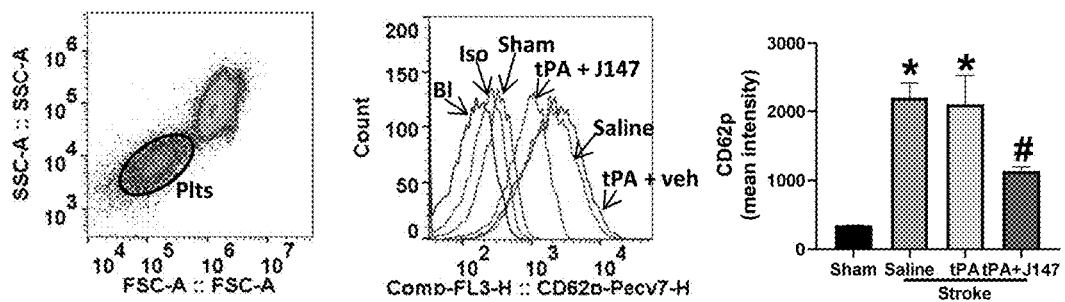
FIG. 9A shows flow cytometric measurement of platelet P-selectin expression in whole blood. Representative gating strategy of platelets in whole blood and histogram of P-selectin (CD62P) expression on platelets in the indicated groups. Data are expressed as mean fluorescence intensity. * P<0.05 vs sham group. #<0.05 vs saline or tPA groups.
FIG. 9B shows gating strategy for flow cytometric analysis of total leukocytes (R2, CD45 positive cells included in R1) in whole blood: neutrophils (N; R3) and monocytes (M; R4) were defined by their differential expression of CD11b and RP-1 (specific for rat granulocytes); and representative flow cytometric dot plots of platelet-neutrophil (CD42d+ CD45+CD11b+PR1+) and -monocyte (CD42d+CD45+ CD11b+PR1−) aggregates in the indicated groups. Fluorescein isothiocyanate (FITC)-labeled CD42d (glycoprotein V) mAb was used as a specific platelet marker to identify platelet neutrophil/monocyte complexes. The quantitative analysis showing the combination treatment significantly alleviates ischemia-induced and delayed tPA-enhanced circulating platelet-neutrophil aggregates, but not in platelet-monocyte aggregates. n=3 rats per group. * P<0.05 vs Sham; #P<0.05 vs saline or tPA groups. N.S; not significant
Figure 9:
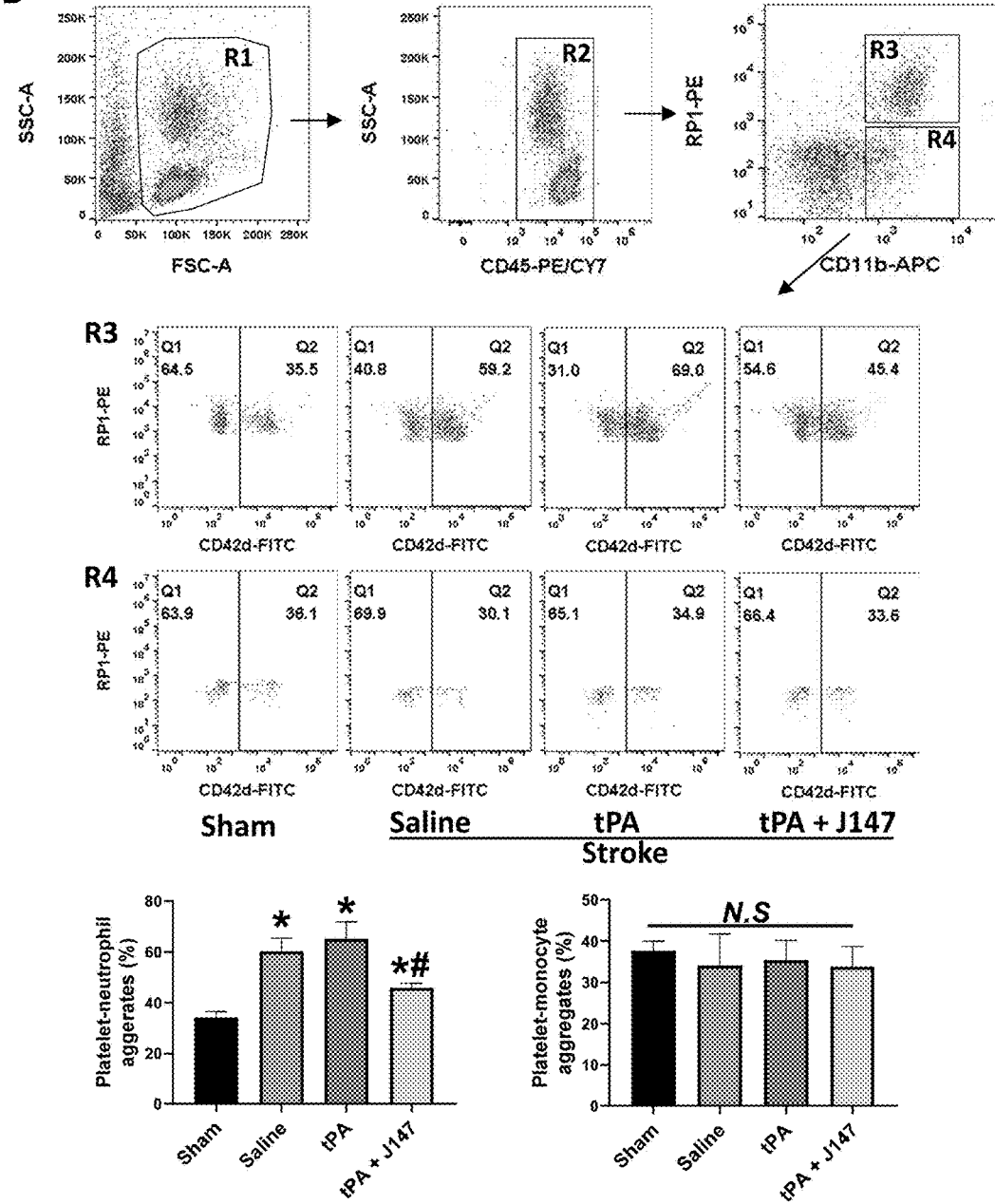

Elevated platelet activation and platelet-leukocyte interaction contribute importantly to pro-inflammatory and thrombotic events during ischemia-reperfusion injury after stroke. We used flow cytometry to analyze platelet activation and platelet-leukocyte aggregates in whole blood at 24 hours after ischemia onset (FIG. 9A).

Methods: Blood was drawn into a heparinized capillary tube via the retro-orbital plexus at 24 h after stroke. Whole blood was diluted 1:10 with Flow Cytometry Staining Buffer (eBioscience) containing rat Fc block anti-rat CD32. For evaluation of platelet activation, sample was co-stained with the FITC mouse anti-rat CD42d (1:200, RPM.4) for platelets and PE/Cy7 mouse anti-rat CD62P (1:100, RMP-1) for P-selectin expression. For detection of platelet-leukocyte aggregates (PLA) formation, samples were co-stained with FITC mouse anti-rat CD42d (1:200, RPM.4), PE mouse anti-rat granulocytes (1:100, RP-1), APC mouse anti-rat CD11b (1:50, WT.5) and PE/Cy7 mouse anti-rat CD45 (1:100, OX-1). Isotype-matched control antibodies were used to differentiate non-specific background signal from specific antibody signals. The samples were analyzed on the BD Accuri™ C6 flow cytometer.

Results: The increased platelet activation (determined by P-selectin expression) and platelet-granulocyte aggregates were found in the saline-treated stroke rats, but IV tPA had no additional effect. However, combination treatment significantly reduced the ischemia-induced platelet P-selectin expression and platelet-granulocyte aggregates. There were no significant changes in the platelet-monocyte aggregates between groups.

Conclusion: J147 treatment attenuates circulating platelet activation and platelet-neutrophil aggregates in vivo.

Example 5—J147 Alone with Embolic MCAO (eMCAO) Model

In this example, an eMCAO experiment was performed to determine if J147 alone (i.e., without administration of TPA or other thrombolytic intervention) provided any therapeutic benefit for stroke in the absence of reperfusion caused by TPA.

Figure 10A:
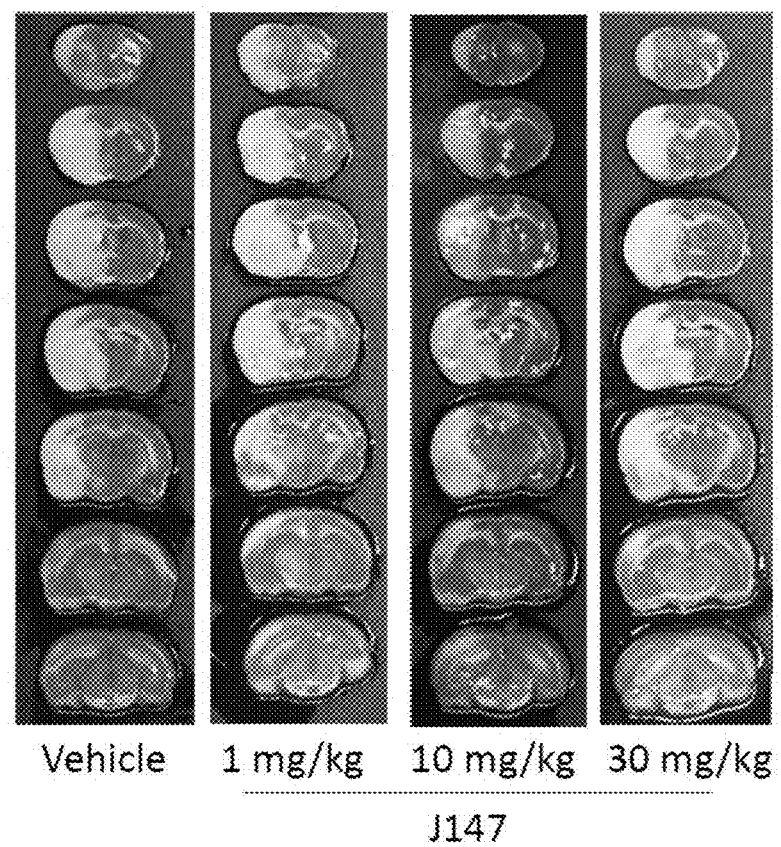
FIG. 10A shows TTC-stained coronal sections of brain isolated from rats treated with vehicle or J147. Red color indicates normal tissue and white color indicates tissue infarction (white color) in the indicated groups. Rats were subjected to 2-hour ischemia followed by administration of J147 or a control, in all cases without reperfusion from administration of TPA.
Figure 10B:
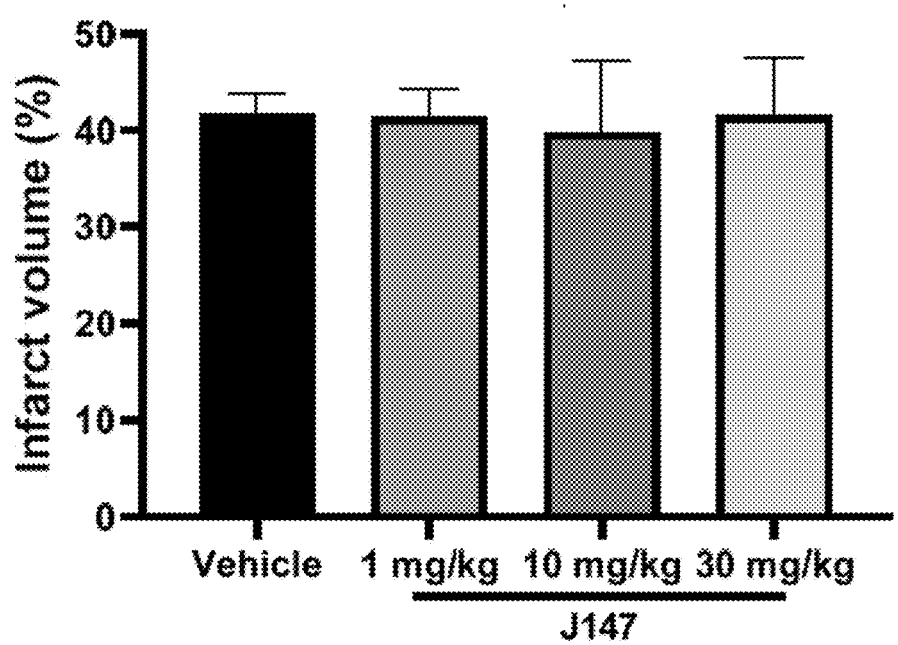
FIG. 10B shows a graphical representation of infarct volume (%) assessed 24 hours after stroke for the experiment shown in FIG. 10A. (n=7-8 per group).

SD rats: 280 to 320 g
Stroke mode: eMCAO, 4 μm blood clot
Bederson scale (tested at 24 hour after ischemia): 0 to 5
No tPA treatment.
147 administered a 0 mg/ml (Vehicle), 1 mg/ml or 10 mg/ml i.v., or 30 mg/ml i.p. two hours after stroke onset. (n-5/group)
J147 stocking solution: 6 mg/ml (30% HS15/70% saline)
J147 working solution: stock solution/saline 1:1 (3 mg/ml, 15% HS15/85% saline)
Vehicle: 15% HS15/85% saline In this example the animals were treated with vehicle or J147 in the absence of reperfusion or TPA treatment. Results are shown in FIGS. 10A and 10B. Representative images are shown (chosen from the median animals of each group) of TTC-stained coronal sections showing tissue infarction (white color) in the indicated groups 24 hours after stroke. These experiments suggest that J147 alone fails to provide any significant protection from stroke in the absence of reperfusion (e.g., reperfusion induced by TPA). By contrast, the prior examples demonstrate a therapeutic effect of the administration of J147 in conjunction with TPA.

Example 6—Certain Non-Limiting Embodiments

A1. A method for preventing, reducing a risk of, inhibiting, reducing, mitigating or treating hemorrhage or vascular instability in a subject, the method comprising administering to the subject a therapeutically effective amount of a compound having the structure of Formula I:

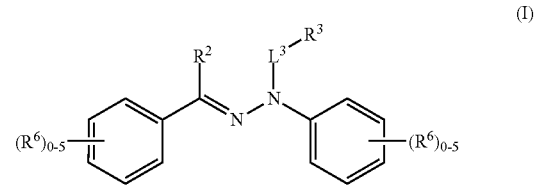

or a pharmaceutically acceptable salt, stereoisomer or tautomer thereof,
wherein:
$R^2$ is selected from the group consisting of H and methyl;
$R^3$ is trifluoromethyl or other fluoro substituted alkyl;
$L^3$ is a carbonyl; and
$R^6$ at each occurrence is independently selected from the group consisting of alkyl, substituted alkyl, cycloalkyl, substituted cycloalkyl, hydroxyl, alkoxy, substituted alkoxy, aryloxy, substituted aryloxy, mercapto, alkylthio, arylthio, carbonyl, aryl, substituted aryl, substituted heterocyclic, halogen, cyano, cyanoalkyl, nitro, amino, amidino, carbamate, S(O)—$R^7$ and C(O)$R^8$ or two $R^6$ at adjacent positions combine to form an optionally substituted heteroaryl or heteroalkyl ring fused with the adjoining phenyl moiety;

$R^7$ is H, $R^9$, $NH_2$, $HNR^9$ or $NR^9R^{10}$.

$R^8$ is OH, $OR^9$, $NH_2$, $NHR^9$ or $NR^9R^{10}$;

$R^9$ and $R^{10}$ at each occurrence are independently optionally substituted alkyl; and n=1 or 2.

A2. The method of embodiment A1, wherein $R^6$ at each occurrence is selected from the group consisting of alkyl, substituted alkyl, hydroxyl, alkoxy, substituted alkoxy, halogen, and C(O)$R^8$.

A3. The method of embodiment A2, wherein $R^6$ at each occurrence is selected from the group consisting of methyl, methoxy, perfluoromethyl, perfluoromethoxy, hydroxyl, Cl, F, and I.

A4. The method of embodiment A1, wherein the compound has the structure of Formula II;

or a pharmaceutically acceptable salt, stereoisomer or tautomer thereof, wherein:

(i) $R^{A2}$, RAJ, $R^{A5}$, and $R^{A6}$ is H, $R^{A3}$ is methoxy, $R^{B2}$ is methyl, and $R^{B4}$ is methyl; or (ii) $R^{A2}$, $R^{A3}$, $R^{A5}$, and $R^{A6}$ is H, $R^{A4}$ is methoxy, $R^{B2}$ is methyl, and $R^{B4}$ is methyl; or (iii) $R^{A2}$, $R^{A3}$, $R^{A4}$, $R^{A5}$, and $R^{A6}$ is H, $R^{B2}$ is H, and $R^{B4}$ is H; or (iv) $R^{A2}$, $R^{A3}$, $R^{A4}$, $R^{A5}$, and $R^{A6}$ is H, $R^{B2}$ is methyl, and $R^{B4}$ is methyl; or (v) $R^{A2}$, $R^{A4}$, $R^{A5}$, and $R^{A6}$ is H, $R^{A3}$ is methoxy, $R^{B2}$ is H, and $R^{B4}$ is H; or (vi) $R^{A2}$, $R^{A3}$, $R^{A4}$, $R^{A5}$, and $R^{A6}$ is H, $R^{B2}$ is H, and $R^{B4}$ is methyl; or (vii) $R^{A2}$, $R^{A4}$, $R^{A5}$, and $R^{A6}$ is H, $R^{A3}$ is methoxy, $R^{B2}$ is H, and $R^{B4}$ is methyl; or (viii) $R^{A2}$, $R^{A3}$, $R^{A4}$, $R^{A5}$, and $R^{A6}$ is H, $R^{B2}$ is methyl, and $R^{B4}$ is H; or (ix) $R^{A2}$, $R^{A4}$, $R^{A5}$, and $R^{A6}$ is H, $R^{A3}$ is methoxy, $R^{B2}$ is methyl, and $R^{B4}$ is H; or (x) $R^{A2}$, $R^{A3}$, $R^{A5}$, and $R^{A6}$ is H, $R^{A4}$ is COOH, $R^{B2}$ is methyl, and $R^{B4}$ is methyl; or (xi) $R^{A2}$, $R^{A4}$, and RAS is H, $R^{A3}$ and $R^{A6}$ is hydroxyl, $R^{B2}$ is methyl, and $R^{B4}$ is methyl; or (xii) $R^{A2}$, $R^{A4}$, and $R^{A6}$ is H, $R^{A3}$ and $R^{A5}$ is hydroxyl, $R^{B2}$ is methyl, and $R^{B4}$ is methyl; or (xiii) $R^{A2}$, $R^{A4}$, and $R^{A5}$ is H, $R^{A3}$ is methoxy, $R^{A6}$ is F, $R^{B2}$ is H, and $R^{B4}$ is Cl; or (xiv) $R^{A3}$ and $R^{A5}$ is H, $R^{A2}$ and $R^{A6}$ is F, $R^{A4}$ is hydroxyl, $R^{A6}$ is F, $R^{B2}$ is H, and $R^{B4}$ is F; or (xv) $R^{A2}$, $R^{A4}$, and $R^{A6}$ is H, $R^{A3}$ is hydroxyl, $R^{A5}$ is F, $R^{B2}$ is H, and $R^{B4}$ is F; or (xvi) $R^{A2}$, $R^{A5}$, and $R^{A6}$ is H, $R^{A3}$ and $R^{A4}$ taken together are —O—$CH_2$—O—, $R^{A5}$ is F, $R^{B2}$ is H, and $R^{B4}$ is F.

A5. The method of embodiment A1, wherein the compound has the structure of Formula III

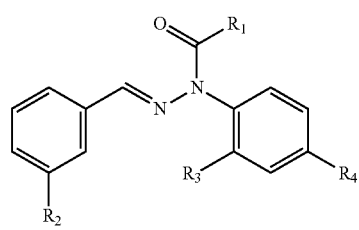

or a pharmaceutically acceptable salt, stereoisomer or tautomer thereof, where $R_1$ is methyl, fluoromethyl, difluoromethyl, trifluoromethyl, bromomethyl, dibromomethyl or tribromomethyl; $R^2$ is methyl, methoxy, hydroxyl, halogen, $CF_3$, $OCH_3$, $OCF_3$ or $OCBr_3$; and $R^3$ and $R^4$ are independently selected from hydrogen, hydroxyl, a halogen (e.g., Cl, F or Br), methyl, a methoxy, and an amine.

A6.1. The method of embodiment A5, wherein the compound has the structure of Formula IV,

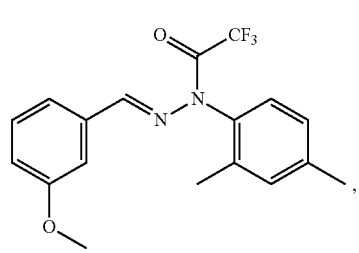

or a pharmaceutically acceptable salt, stereoisomer or tautomer thereof.

A6.2. The method of any one of embodiments A1 to A6.1, wherein the hemorrhage or vascular instability is induced by a thrombolytic therapy, an anticoagulant therapy or an endovascular intervention therapy comprises mechanical thrombectomy.

A7. The method of any one of embodiments A1 to A6.2, where the hemorrhage comprises internal bleeding.

A7.1. The method of any one of embodiments A1 to A7, wherein the hemorrhage comprises a Class I hemorrhage.

A7.2. The method of any one of embodiments A1 to A7.1, wherein the hemorrhage comprises an estimated blood loss equal to or less than 15%, 10%, 5%, 2%, or equal to or less than 1% of total blood volume.

A8. The method of any one of embodiments A1 to A7.2, wherein the hemorrhage comprises hemorrhage transformation.

A8.1. The method of any one of embodiments A1 to A8, wherein the hemorrhage comprises a cerebral or brain hemorrhage.

A8.2. The method of any one of embodiments A1 to A8.1, wherein the inhibiting, reducing, mitigating or treating the hemorrhage comprises reducing hemorrhage volume.

A9. The method of any one of embodiments A1 to A8.2, wherein the vascular instability comprises endothelial dysfunction.

A10. The method of any one of embodiments A1 to A9, wherein the vascular instability comprises a reduction or loss of vascular tone or hemostasis.

A11. The method of any one of embodiments A1 to A10, wherein the vascular instability comprises edema.

A12. The method of any one of embodiments A1 to A11, wherein the edema comprises cerebral edema or swelling of the blood brain barrier.

A13. The method of any one of embodiments A1 to A12, wherein the vascular instability comprises injury of the vascular endothelium or blood brain barrier due to reperfusion.

A14. The method of any one of embodiments A1 to A13, comprising protecting and/or stabilizing vascular endothelium in the subject.

A15. The method of embodiment A14, wherein the vascular endothelium comprises a blood brain barrier.

A16. The method of any one of embodiments A1 to A15, comprising preventing or treating disruption of the blood brain barrier in the subject.

A17. The method of any one of embodiments A1 to A16, wherein the subject is scheduled to receive, is receiving, or received a thrombolytic therapy or an anticoagulant therapy.

A18. The method of any one of embodiments A1 to A17, wherein the subject is at risk of hemorrhage.

A19. The method of any one of embodiments A6.2 to A18, wherein the thrombolytic therapy comprises administration of a tissue plasminogen activator (TPA), a streptokinase, a streptokinase activator or a urokinase.

A20. The method of embodiment A19, wherein the streptokinase activator is an anisoylated plasminogen streptokinase activator complex.

A21. The method of embodiment A20, wherein the anisoylated plasminogen streptokinase activator complex is anistreplase or Eminase.

A22. The method of embodiment A19, wherein the urokinase is a urokinase-type plasminogen activator.

A23. The method of embodiment A22, wherein the urokinase-type plasminogen activator is saruplase.

A24. The method of embodiment A19, wherein the tissue plasminogen activator is a recombinant TPA.

A25. The method of embodiment A19 or A23, wherein the tissue plasminogen activator is alteplase (Activase), reteplase (Retavase), or tenecteplase (TNKase, Metalyse).

A26. The method of any one of embodiments A6.2 to A25, wherein the anticoagulant therapy comprises administration of a vitamin K antagonist.

A27. The method of embodiment 26, wherein the vitamin K antagonist is warfarin.

A27.1. The method of any one of embodiments A6.2 to A26, where the anticoagulant therapy comprises administration of heparin, a derivative thereof, or a low molecular weight heparin.

A28. The method of embodiment A27.1, wherein the derivative of heparin, or the low molecular weight heparin is selected from enoxaparin, dalteparin, tinzaparin and danaparoid.

A29. The method of any one of embodiments A6.2 to A28, wherein the anticoagulant therapy comprises administration of a thrombin inhibitor.

A30. The method of embodiment A29, wherein the thrombin inhibitor is selected from bivalirudin, argatroban, dabigatran, desirudin, lepirudin and antithrombin III.

A31. The method of any one of embodiments A6.2 to A30, wherein the anticoagulant therapy comprises administration of a Factor Xa inhibitor.

A32. The method of embodiment A31, wherein the Factor Xa inhibitor is selected from apixaban, fondaparinux, rivaroxaban, edoxaban and betrixaban.

A33. The method of any one of embodiments A1 to A32, wherein the method further comprises administering a thrombolytic therapy, an anticoagulant therapy or an endovascular intervention therapy to the subject.

A34. The method of any one of embodiments A1 to A33, wherein the subject is a mammal or a human.

A35. A pharmaceutical composition comprising a compound comprising a structure selected from any one of Formula I, Formula II, Formula III and Formula IV for use in conducting a method of any one of embodiments A1 to A34.

B1. A method for preventing, reducing a risk of, inhibiting, reducing, mitigating or treating reperfusion injury in a subject, the method comprising administering to the subject a therapeutically effective amount of a compound having the structure of Formula III:

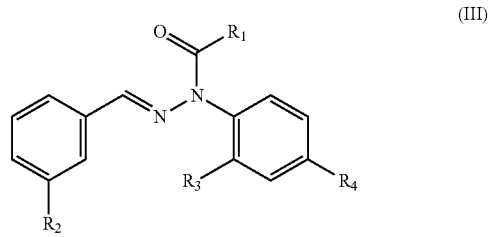

(III)

or a pharmaceutically acceptable salt, stereoisomer or tautomer thereof, where $R_1$ is methyl, fluoromethyl, difluoromethyl, trifluoromethyl, bromomethyl, dibromomethyl or tribromomethyl; $R_2$ is methyl, methoxy, hydroxyl, halogen, $CF_3$, $OCH_3$, $OCF_3$ or $OCBr_3$; and $R_3$ and $R_4$ are independently selected from hydrogen, hydroxyl, a halogen (e.g., Cl, F or Br), methyl, a methoxy, and an amine.

B2. The method of embodiment B1, wherein the compound comprises or consists of the structure of Formula IV;

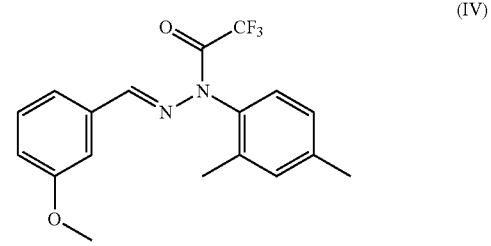 [SMILES: COc1cccc(/C=N/N(C(=O)C(F)(F)F)c2ccc(C)cc2C)c1]

(IV)

or a pharmaceutically acceptable salt, stereoisomer or tautomer thereof.

B3. The method of embodiment B1 or B2, wherein the reperfusion injury is induced by a thrombolytic therapy or an anticoagulant therapy.

B4. The method of embodiment B1 or B2, wherein the reperfusion injury is induced by an endovascular intervention therapy.

B5. The method of embodiment B4, wherein the endovascular intervention comprises mechanical thrombectomy.

B6. The method of any one of embodiments B1 to B5, wherein the reperfusion injury comprises or consists of ischemic reperfusion injury.

B6.1. The method of any one of embodiments B1 to B6, wherein the reperfusion injury comprises or consists of cerebral reperfusion injury, hepatic reperfusion injury or myocardial reperfusion injury.

B7 The method of any one of embodiments B1 to B6.1, comprising protecting and/or stabilizing vascular endothelium in the subject.

B8. The method of embodiment B7, wherein the vascular endothelium comprises a blood brain barrier.

B9. The method of any one of embodiments B1 to B8, comprising preventing or treating disruption of the blood brain barrier in the subject.

B10. The method of any one of embodiments B1 to B9, wherein the subject is scheduled to receive, is receiving, or received a thrombolytic therapy or an anticoagulant therapy.

B11. The method of any one of embodiments B1 to B10, wherein the subject is at risk of hemorrhage.

B12. The method of any one of embodiments B1 to B11, wherein the hemorrhage comprises internal hemorrhage.

B13. The method of any one of embodiments B1 to B12, wherein the hemorrhage comprises hemorrhagic transformation.

B14. The method of any one of embodiments B1 to B13, wherein the hemorrhage comprises a hemorrhage in the brain.

B15. The method of any one of embodiments B1 to B14, wherein the method comprises reducing hemorrhage volume.

B16. The method of any one of embodiments B3 to B15, wherein the thrombolytic therapy comprises administration of a tissue plasminogen activator (TPA), a streptokinase, a streptokinase activator or a urokinase.

B17. The method of embodiment B16, wherein the streptokinase activator is an anisoylated plasminogen streptokinase activator complex.

B18. The method of embodiment B17, wherein the anisoylated plasminogen streptokinase activator complex is anistreplase or Eminase.

B19. The method of embodiment B16, wherein the urokinase is a urokinase-type plasminogen activator.

B20. The method of embodiment B19, wherein the urokinase-type plasminogen activator is saruplase.

B21. The method of embodiment B16, wherein the tissue plasminogen activator is a recombinant TPA.

B22. The method of embodiment B16 or B21, wherein the tissue plasminogen activator is alteplase (Activase), reteplase (Retavase), or tenecteplase (TNKase, Metalyse).

B23. The method of any one of embodiments B1 to B22, wherein the anticoagulant therapy comprises administration of a vitamin K antagonist.

B24. The method of embodiment B23, wherein the vitamin K antagonist is warfarin.

B25. The method of any one of embodiments B1 to B24, where the anticoagulant therapy comprises administration of heparin, a derivative thereof, or a low molecular weight heparin.

B26. The method of embodiment B25, wherein the derivative of heparin, or the low molecular weight heparin is selected from enoxaparin, dalteparin, tinzaparin and danaparoid.

B27. The method of any one of embodiments B1 to B26, wherein the anticoagulant therapy comprises administration of a thrombin inhibitor.

B28. The method of embodiment B27, wherein the thrombin inhibitor is selected from bivalirudin, argatroban, dabigatran, desirudin, lepirudin and antithrombin III.

B29. The method of any one of embodiments B1 to B28, wherein the anticoagulant therapy comprises administration of a Factor Xa inhibitor.

B30. The method of embodiment B29, wherein the Factor Xa inhibitor is selected from apixaban, fondaparinux, rivaroxaban, edoxaban and betrixaban.

B31. The method of any one of embodiments B1 to B30, wherein the method further comprises administering a thrombolytic therapy, an anticoagulant therapy or an endovascular intervention therapy to the subject.

B32. The method of any one of embodiments B1 to B31, wherein the subject is human.

B33. A compound comprising the structure of Formula III and Formula IV for use in conducting the method of any one of embodiments B1 to B32.

The entirety of each patent, patent application, publication or any other reference or document cited herein hereby is incorporated by reference. In case of conflict, the specification, including definitions, will control.

Citation of any patent, patent application, publication or any other document is not an admission that any of the foregoing is pertinent prior art, nor does it constitute any admission as to the contents or date of these publications or documents.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein.

All of the features disclosed herein may be combined in any combination. Each feature disclosed in the specification may be replaced by an alternative feature serving a same, equivalent, or similar purpose. Thus, unless expressly stated otherwise, disclosed features (e.g., antibodies) are an example of a genus of equivalent or similar features.

The phrase "induced by", encompasses "worsened by", "aggravated by", "exacerbated by", and/or "magnified by", unless clearly indicated otherwise.

As used herein, all numerical values or numerical ranges include integers within such ranges and fractions of the values or the integers within ranges unless the context clearly indicates otherwise. Further, when a listing of values is described herein (e.g., about 50%, 60%, 70%, 80%, 85% or 86%) the listing includes all intermediate and fractional values thereof (e.g., 54%, 85.4%). Thus, to illustrate, reference to 80% or more identity, includes 81%, 82%, 83%, 84%, 85%, 86%, 87%, 88%, 89%, 90%, 91%, 92%, 93%, 94% etc., as well as 81.1%, 81.2%, 81.3%, 81.4%, 81.5%, etc., 82.1%, 82.2%, 82.3%, 82.4%, 82.5%, etc., and so forth.

Reference to an integer with more (greater) or less than includes any number greater or less than the reference number, respectively. Thus, for example, a reference to less than 100, includes 99, 98, 97, etc. all the way down to the number one (1); and less than 10, includes 9, 8, 7, etc. all the way down to the number one (1).

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth.

Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, 1,000-1,500, 1,500-2,000, 2,000-2,500, 2,500-3,000, 3,000-3,500, 3,500-4,000, 4,000-4,500, 4,500-5,000, 5,500-6,000, 6,000-7,000, 7,000-8,000, or 8,000-9,000, includes ranges of 10-50, 50-100, 100-1,000, 1,000-3,000, 2,000-4,000, etc.

Modifications can be made to the foregoing without departing from the basic aspects of the technology. Although the technology has been described in substantial detail with reference to one or more specific embodiments, those of ordinary skill in the art will recognize that changes can be made to the embodiments specifically disclosed in this application, yet these modifications and improvements are within the scope and spirit of the technology.

The invention is generally disclosed herein using affirmative language to describe the numerous embodiments and aspects. The invention also specifically includes embodiments in which particular subject matter is excluded, in full or in part, such as substances or materials, method steps and conditions, protocols, or procedures. For example, in some embodiments or aspects of the methods disclosed herein, some materials and/or method steps are excluded. Thus, even though the invention is generally not expressed herein in terms of what the invention does not include aspects that are not expressly excluded in the invention are nevertheless disclosed herein.

Some embodiments of the technology described herein suitably can be practiced in the absence of an element not specifically disclosed herein. Accordingly, in some embodiments the term "comprising" or "comprises" can be replaced with "consisting essentially of" or "consisting of" or grammatical variations thereof. A composition "consisting essentially of" refers to a composition that includes only the active ingredients claimed (e.g., active ingredient (AI) or active pharmaceutical ingredient (API); e.g., TPA and/or a compound described and claimed herein); which composition may include other ingredients such as formulation materials, excipients, additives, carriers, preservatives, diluents, solvents, fillers, salts, buffers, coatings, binders, and lubricating agents; and which composition excludes other APIs not claimed.

The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. The term, "substantially" as used herein refers to a value modifier meaning "at least 95%", "at least 96%", "at least 97%", "at least 98%", or "at least 99%" and may include 100%. For example, a composition that is substantially free of X, may include less than 5%, less than 4%, less than 3%, less than 2%, or less than 1% of X, and/or X may be absent or undetectable in the composition.

We claim:

1. A method of reducing a risk of, reducing, mitigating or treating hemorrhage in a subject, wherein the hemorrhage is induced by a thrombolytic therapy or an anticoagulant therapy or an endovascular intervention therapy, the method comprising administering to the subject a therapeutically effective amount of a compound having the structure of Formula III:

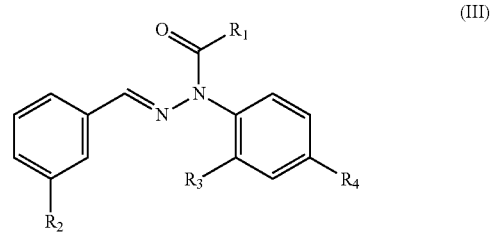

or a pharmaceutically acceptable salt, stereoisomer or tautomer thereof, where R1 is methyl, fluoromethyl, difluoromethyl, trifluoromethyl, bromomethyl, dibromomethyl or tribromomethyl; R2 is methyl, methoxy, hydroxyl, halogen, CF3, OCH3, OCF3 or OCBr3; and R3 and R4 are independently selected from hydrogen, hydroxyl, a halogen, methyl, a methoxy, and an amine.

2. The method of claim 1, wherein the subject is scheduled to receive, is receiving, or received a thrombolytic therapy or an anticoagulant therapy.

3. The method of claim 1, wherein the subject is at risk of hemorrhage.

4. The method of claim 1, wherein the hemorrhage comprises internal hemorrhage.

5. The method of claim 1, wherein the hemorrhage comprises hemorrhagic transformation.

6. The method of claim 1, wherein the hemorrhage comprises a hemorrhage in the brain.

7. The method of claim 1, wherein the method comprises reducing hemorrhage volume.

8. The method of claim 1, wherein the hemorrhage is induced by a thrombolytic therapy and the thrombolytic therapy comprises administration of a tissue plasminogen activator (TPA), a streptokinase, a streptokinase activator or a urokinase.

9. The method of claim 8, wherein the tissue plasminogen activator is alteplase (Activase), reteplase (Retavase), or tenecteplase (TNKase, Metalyse).

10. The method of claim 1, wherein the hemorrhage is induced by an endovascular intervention therapy and the endovascular intervention comprises mechanical thrombectomy.

11. The method of claim 1, wherein the compound comprises or consists of the structure of Formula IV;

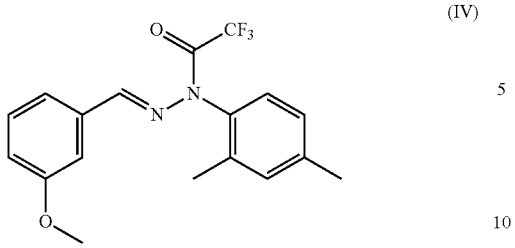
(IV)

or a pharmaceutically acceptable salt, stereoisomer or tautomer thereof.

12. The method of claim 2, wherein the thrombolytic therapy comprises administration of a tissue plasminogen activator (TPA), a streptokinase, a streptokinase activator or a urokinase.

13. The method of claim 12, wherein the tissue plasminogen activator is alteplase (Activase), reteplase (Retavase), or tenecteplase (TNKase, Metalyse).

14. The method of claim 1 wherein the subject has had an ischemic stroke and is administered a tissue plasminogen activator (TPA).

15. The method of claim 14, wherein the compound is administered prior to, during or after administration of the TPA.

* * * * *